United States Patent
Liu et al.

(10) Patent No.: US 10,659,452 B2
(45) Date of Patent: May 19, 2020

(54) DYNAMIC GRAPHICAL PASSWORD-BASED NETWORK REGISTRATION METHOD AND SYSTEM

(71) Applicant: Dalian Magic Image Technology Co., Ltd., Dalian, Liaoning (CN)

(72) Inventors: Wei Liu, Liaoning (CN); Yuntao Ma, Liaoning (CN); Guanhua Sun, Liaoning (CN); Yongsheng Xu, Liaoning (CN); Jun Huang, Liaoning (CN)

(73) Assignee: Dalian Magic Image Technology Co., Ltd., Dalian, Liaoning (CN)

( * ) Notice: Subject to any disclaimer, the term of this patent is extended or adjusted under 35 U.S.C. 154(b) by 165 days.

(21) Appl. No.: 16/072,146

(22) PCT Filed: Jan. 25, 2017

(86) PCT No.: PCT/CN2017/072626
§ 371 (c)(1),
(2) Date: Jul. 23, 2018

(87) PCT Pub. No.: WO2017/129133
PCT Pub. Date: Aug. 3, 2017

(65) Prior Publication Data
US 2019/0034614 A1     Jan. 31, 2019

(30) Foreign Application Priority Data
Jan. 29, 2016     (CN) .......................... 2016 1 0065309

(51) Int. Cl.
*H04L 29/06*     (2006.01)
*H04L 9/08*     (2006.01)
(Continued)

(52) U.S. Cl.
CPC ............ *H04L 63/083* (2013.01); *G06F 21/36* (2013.01); *G06F 21/46* (2013.01); *H04L 9/0863* (2013.01);
(Continued)

(58) Field of Classification Search
CPC .................................................... H04L 63/083
See application file for complete search history.

(56) References Cited

U.S. PATENT DOCUMENTS 8,756,672 B1 *   6/2014   Allen ...................... G06F 21/36
                                                      345/173
8,881,251 B1 *   11/2014   Hilger .................. H04L 63/083
                                                      713/183
(Continued)

FOREIGN PATENT DOCUMENTS

CN       101316166 A       12/2008
CN       103701615 A       4/2014
(Continued)

OTHER PUBLICATIONS

Extended European Search Report for European Application No. 17743748.0 dated Aug. 21, 2019, 9 pages.

*Primary Examiner* — Bradley W Holder
(74) *Attorney, Agent, or Firm* — Bret E. Field; Bozicevic, Field & Francis LLP

(57) ABSTRACT

The present application provides a dynamic graphical password-based network registration method and system. The method includes: a server receives a registration request transmitted by a client, selects positioning factors from a positioning factor library based on a structure of a full-element dynamic factor table, generates positioning factor strings, and transmits the generated positioning factor strings to the client; the client generates full-element dynamic factor tables based on the structure of the full-element dynamic factor table and the positioning factor (Continued)

strings, wherein a user inputs two dynamic graphical passwords through the full-element dynamic factor tables, and transmits registration information including a user name and the positioning rules corresponding to the dynamic graphical passwords to the server; wherein if the registration information is correct, the positioning rule in the registration information is used as the password of the user. In the method, the input dynamic graphical password is used as the password stored for the user, which is securer, easy to remember, and hard to crack as compared with a conventional password consisting of fixed numerals or characters.

7 Claims, 19 Drawing Sheets

(51) Int. Cl.
    *H04L 9/32*     (2006.01)
    *G06F 21/36*     (2013.01)
    *G06F 21/46*     (2013.01)
(52) U.S. Cl.
    CPC .......... *H04L 9/0872* (2013.01); *H04L 9/3228* (2013.01); *H04L 29/06* (2013.01); *H04L 63/08* (2013.01); *H04L 63/0838* (2013.01); *H04L 63/205* (2013.01); *H04L 2209/80* (2013.01)

(56) References Cited

U.S. PATENT DOCUMENTS

| | | | | |
|---|---|---|---|---|
| 9,053,294 | B2* | 6/2015 | Burkill | G06F 21/36 |
| 2006/0020815 | A1* | 1/2006 | Varghese | G06F 21/36 |
| | | | | 713/182 |
| 2007/0192615 | A1* | 8/2007 | Varghese | G06F 21/36 |
| | | | | 713/182 |
| 2007/0271465 | A1* | 11/2007 | Wu | G06F 21/36 |
| | | | | 713/183 |
| 2007/0277224 | A1* | 11/2007 | Osborn | G06F 21/36 |
| | | | | 726/2 |
| 2008/0098464 | A1* | 4/2008 | Mizrah | G06F 21/36 |
| | | | | 726/5 |
| 2010/0281526 | A1 | 11/2010 | Raghaven | |
| 2011/0055585 | A1* | 3/2011 | Lee | H04L 9/0844 |
| | | | | 713/183 |
| 2013/0167225 | A1* | 6/2013 | Sanft | G06F 21/36 |
| | | | | 726/19 |
| 2014/0030688 | A1* | 1/2014 | Lolli | G09B 7/00 |
| | | | | 434/350 |
| 2014/0259105 | A1* | 9/2014 | Alibakhsh | H04L 63/08 |
| | | | | 726/3 |
| 2014/0359734 | A1* | 12/2014 | Natividad | H04L 63/083 |
| | | | | 726/6 |
| 2015/0012339 | A1* | 1/2015 | Onischuk | G07C 13/00 |
| | | | | 705/12 |
| 2016/0359839 | A1* | 12/2016 | Natividad | H04L 63/083 |

FOREIGN PATENT DOCUMENTS

| | | |
|---|---|---|
| CN | 104700007 A | 6/2015 |
| CN | 104978144 A | 10/2015 |
| CN | 105763536 A | 7/2016 |
| JP | 2005-196800 A | 7/2005 |
| JP | 2007-264839 A | 10/2007 |
| WO | WO2011099161 A1 | 8/2011 |
| WO | WO2014188554 A1 | 11/2014 |

* cited by examiner

| A | D | C | | A | G | D |
|---|---|---|---|---|---|---|
| F | G | G | | D | C | A |
| A | C | F | | G | B | G |

| C | A | B | | B | F | E |
|---|---|---|---|---|---|---|
| E | F | D | | E | D | F |
| F | C | A | | C | B | F |

Fig.3

| 1 | 7 | 1 | | 2 | 9 | 4 |
|---|---|---|---|---|---|---|
| 3 | 6 | 5 | | 5 | 8 | 7 |
| 1 | 4 | 8 | | 6 | 1 | 0 |

| 9 | 1 | 5 | | 5 | 0 | 2 |
|---|---|---|---|---|---|---|
| 4 | 8 | 4 | | 8 | 2 | 7 |
| 5 | 6 | 3 | | 7 | 0 | 1 |

DYNAMIC GRAPHICAL PASSWORD-BASED NETWORK REGISTRATION METHOD AND SYSTEM

The present application claims priority to Chinese Patent Application No. 201610065309.8, entitled "DYNAMIC GRAPHICAL PASSWORD-BASED NETWORK REGISTRATION METHOD AND SYSTEM", filed with the Chinese Patent Office on Jan. 29, 2016, which is incorporated herein by reference in its entirety.

TECHNICAL FIELD

The present application relates to the technical field of cyber security, and in particular, to a dynamic graphical password-based network registration method and system.

BACKGROUND

With the development of Internet technologies, an increasing number of websites are capable of providing Internet services. In order to obtain a service provided by a website, a user needs to log into a target service website by using a network terminal, and then obtain the service provided by the target service website by accessing the target service website. In order to ensure the security of network access, it is necessary for the target service website to authenticate the identity of the user on the network terminal side. Usually, the information used in the identity authentication is closely related to the registration information. In other words, the registration method of the user directly affects the information and rule that are used in user identity authentication, and further affects the security of network access.

Currently, a combination of user name and conventional password is usually used by the websites providing Internet services to implement network registration of users. In such a method, if a password is set too simple, the password is easy to be stolen and cracked, which is usually referred to as a weak-password security threat; if a user name and a password are set too complex, it is difficult to remember the password. To overcome the disadvantages of the network registration method above, various improved network registration methods, e.g., method for conducting network registration for a user using a dynamic password such as short message service (SMS) and hardware token, are proposed. Although these methods achieve higher security than those using a fixed password, they still have many defects. For example, for an SMS message, it is easily captured and intercepted by a pseudo base station, and is unavailable when the mobile phone is out of network coverage or in other situations; and for a hardware token, it is vulnerable to damage, failure, loss, or other problems.

Another popular network registration method is a graphical password-based network registration method, which has a high security and is easy to remember, and is widely applied to the fields such as mobile phone unlocking and security payment. However, when network registration of a user is performed by using a graphical password, a terminal device needs to support touch screen operations. Because a fixed graphic is used, when the user inputs the graphic through making a selection or sliding on the screen, it is easy for someone to peep at the operations of the user. Moreover, when the user taps or slides on the screen, a tap or slide trace is easily left, and the user password is easily guessed according to the trace. In addition, because the number of points of the graphic is limited, each point can only be used once and the graphic needs to be composed of consecutive points, in the method, only a small number of available graphical passwords can be generated, and the passwords have a high repetition rate, which greatly increases the risk of graphical passwords being cracked. As a result, the method is applicable only to a stand-alone situation, and cannot meet the security needs of the great Internet users during registration.

SUMMARY

The present application provides a dynamic graphical password-based network registration method and system, so as to resolve the problem that a prior password is easy to crack and difficult to remember.

To resolve the foregoing technical problem, the embodiments of the present application disclose the following technical solutions:

A dynamic graphical password-based network registration method includes:

receiving, by a server, a registration request transmitted by a client;

generating two positioning factor strings based on positioning factors selected from a positioning factor library, and transmitting the generated two positioning factor strings to the client;

generating, by the client, full-element dynamic factor tables based on the positioning factor strings, inputting, by a user, two dynamic graphical passwords based on the full-element dynamic factor tables, and transmitting registration information including a user name and the dynamic graphical passwords to the server; and if positioning rules, obtained through parsing the two dynamic graphical passwords in the registration information received by the server, are consistent, using the positioning rule in the registration information as a password of the user and storing the password to complete a user registration.

Preferably, the method further includes a step of determining, through negotiation between the client and the server, the structure of the full-element dynamic factor table.

Preferably, the client and the server determine the structure of the full-element dynamic factor table by negotiating a difficulty coefficient of the full-element dynamic factor table.

Preferably, the user inputs the two dynamic graphical passwords based on two full-element dynamic factor tables.

Preferably, the full-element dynamic factor table includes an outer table and an inner table, the outer table comprises at least one inner table, each inner table includes a plurality of positioning factors, and a same positioning factor appears at least twice in the full-element dynamic factor table.

Preferably, the method further includes negotiating, by the client and the server, an identification rule of the inner table, or a distribution change rule of the inner table in the outer table.

Preferably, the distribution change rule includes: a clockwise change rule, a counterclockwise change rule, or a random change rule.

Preferably, each of the dynamic graphical passwords comprises a positioning graphic formed by at least one positioning factor according to the positioning rule, and the positioning rule comprises one of combining of consecutive positioning factors, combining of non-consecutive positioning factors, combining of repeating positioning factors at a same location, and combining of fixed characters, or any combination thereof.

Preferably, the positioning factor includes an English letter, a word, a Chinese character, a numeral, a symbol, an image, or a color.

A dynamic graphical password-based network registration system, comprising: a server providing registration service for a network access user, a client that is connected to the server via a network and provides network registration for the user, and a positioning factor library, wherein the server comprises: a first receiving unit configured to receive information from the client, a first transmitting unit configured to transmit information to the client, and a positioning factor string generation unit, an information parsing unit, and an information determining unit that are connected to the first receiving unit and the first transmitting unit;

wherein the positioning factor string generation unit is configured to generate two positioning factor strings based on positioning factors selected from the positioning factor library, and transmit the generated two positioning factor strings to the client through the first transmitting unit;

the information parsing unit is configured to parse two dynamic graphical passwords to obtain positioning rules corresponding to the two dynamic graphical passwords; and the information determining unit is configured to determining that the positioning rules obtained through parsing the two dynamic graphical passwords are consistent, and store the positioning rule in registration information as a password of the user; and the client includes: a second receiving unit configured to receive information from the server, a second transmitting unit configured to transmit information to the server, and an information processing unit connected to both of the second receiving unit and the second transmitting unit;

wherein the information processing unit is configured to generate full-element dynamic factor tables based on the positioning factor strings, receive the two dynamic graphical passwords input by the user based on the full-element dynamic factor tables, and transmit the registration information including a user name and the dynamic graphical passwords to the server through the second transmitting unit.

Preferably, between the first receiving unit and the first transmitting unit, the server further includes a first negotiation unit configured to negotiate a structure of the full-element dynamic factor table with the client; and between the second receiving unit and the second transmitting unit, the client further includes a second negotiation unit configured to negotiate the structure of the full-element dynamic factor table with the server.

A dynamic graphical password-based network registration method includes:

obtaining, by a client, a structure of a full-element dynamic factor table;

selecting positioning factors from a positioning factor library based on the structure of the full-element dynamic factor table, and generating two positioning factor strings;

inputting, by a user, two dynamic graphical passwords based on two full-element dynamic factor tables generated based on the two positioning factor strings, and transmitting registration information including the two dynamic graphical passwords and information of the two full-element dynamic factor tables to a server;

receiving, by the server, the registration information transmitted by the client;

if consistent positioning rules obtained through parsing the two dynamic graphical passwords are consistent, using the positioning rule in the registration information as a password of the user, and storing the password to complete a user registration.

Preferably, obtaining, by a client, the structure of the full-element dynamic factor table includes:

transmitting, by the client, a registration request to the server; and determining, by the server, the structure of the full-element dynamic factor table based on the registration request, and transmitting the structure of the full-element dynamic factor table to the client.

A dynamic graphical password-based network registration system includes: a server providing a registration service for a network access user, and a client that is connected to the server via a network and provides network registration for the user, wherein the client includes: a dynamic factor table structure obtaining unit, an information processing unit, and a first transmitting unit configured to transmit information to the server;

wherein the dynamic factor table structure obtaining unit is configured to obtain a structure of a full-element dynamic factor table;

the information processing unit is configured to select positioning factors from a positioning factor library based on the structure of the dynamic factor table, and generate two positioning factor strings, and input, by the user, two dynamic graphical passwords based on two full-element dynamic factor tables generated based on the two positioning factor strings; and the first transmitting unit is configured to transmit registration information including the two dynamic graphical passwords and information of the two full-element dynamic factor tables to the server; and the server includes: a first receiving unit configured to receive information from the client, an information parsing unit, and an information determining unit;

wherein the information parsing unit is configured to parse the two dynamic graphical passwords to obtain positioning rules corresponding to the two dynamic graphical passwords; and the information determining unit is configured to determine that the positioning rules obtained through parsing the two dynamic graphical passwords are consistent, and store the positioning rule in registration information as a password of the user.

A dynamic graphical password-based network registration method includes:

obtaining, by a client, a structure of a full-element dynamic factor table;

selecting positioning factors from a positioning factor library based on the structure of the full-element dynamic factor table, and generating two first positioning factor strings;

inputting, by a user, two dynamic graphical passwords based on two first full-element dynamic factor tables generated based on the two first positioning factor strings, and transmitting registration information including the two dynamic graphical passwords to a server;

receiving, by the server, the registration information transmitted by the client;

generating two second full-element dynamic factor tables that are the same as the two first full-element dynamic factor tables; and parsing the two dynamic graphical passwords based on the two second full-element dynamic factor tables, and if positioning rules obtained through parsing the two dynamic graphical passwords are consistent, using the positioning rule in the registration information as a password of the user, and storing the password, to complete a user registration.

A dynamic graphical password-based network registration system includes: a server providing registration service for a network access user, a client that is connected to the server via a network and provides network registration for the user, and a positioning factor library, wherein the client includes: a dynamic factor table structure obtaining unit, an information processing unit, and a first transmitting unit configured to transmit information to the server;

wherein the dynamic factor table structure obtaining unit is configured to obtain a structure of a full-element dynamic factor table; and the information processing unit is configured to select positioning factors from the positioning factor library based on the structure of the full-element dynamic factor table, generate two first positioning factor strings, and transmit registration information comprising two dynamic graphical passwords to the server, wherein the two dynamic graphical passwords are inputted by the user based on two first full-element dynamic factor tables generated based on the two first positioning factor strings, and the server includes: a first receiving unit configured to receive information from the client, a dynamic factor table generation unit, an information parsing unit, and an information determining unit;

where the dynamic factor table generation unit is configured to generate two second full-element dynamic factor tables that are the same as the two first full-element dynamic factor tables;

the information parsing unit is configured to parse, based on the two second full-element dynamic factor tables, the two dynamic graphical passwords to obtain positioning rules corresponding to the two dynamic graphical passwords; and The information determining unit is configured to determine that the positioning rules obtained through parsing the two dynamic graphical passwords are consistent, and store the positioning rule in registration information as the password of the user.

As can be seen from the foregoing technical solutions, the dynamic graphical password-based network registration method and system provided in according to embodiments of the present application have the following beneficial effects:

1. When the user performs registration on the client, the user respectively inputs two dynamic graphical passwords having a specific positioning rule in full-element dynamic factor tables into which positioning factor strings are mapped, and the positioning rule corresponding to the input dynamic graphical passwords is used as the password stored for the user. The dynamic graphical password is formed by a positioning graphic, and therefore the password is easy to remember and not easy to forget, as compared with a conventional password consisting of numerals or characters.

2. Because a different positioning factor string is generated by the server each, a different full-element dynamic factor table is displayed to the user. A fixed positioning rule is used by the user to input a dynamic graphical password, and accordingly a different password is input based on a full-element dynamic factor table. Therefore, the input of password is not afraid of peep, and even intrusion or interception of viruses such as Trojan, phishing, and the like, and such an input of password can be performed freely in various scenarios.

3. The types of the positioning factors in the positioning factor library include: English letter, word, Chinese charac-ter, numeral, symbol, image, color, etc., which improves the randomness and anti-counterfeiting performance of the full-element dynamic factor table. The dynamic graphical password set by the user includes: a combination of consecutive positioning factors, a combination of non-consecutive positioning factors, a combination of repeated positioning factors at the same location, conventional fixed characters, and any combination thereof. Therefore, the flexibility and diversification of the dynamic graphical password are further enhanced, and the dynamic graphical password has a low repetition rate and an increased complexity, which makes it more hard to crack a registered dynamic graphical password.

4. Transmission is performed between the client and the server over a Secure Sockets Layer (SSL) communication link, and data transmitted is encrypted data. Moreover, the full-element dynamic factor table and the input dynamic graphical password change each time. Therefore, even if the input dynamic graphical password is intercepted, the real positioning graphic of the user still cannot be cracked. Therefore, it is possible that the dynamic graphical password is immune against interception and crack, having high anti-counterfeiting performance and high security.

5. The dynamic graphical password input by the user is implemented by means of software, independent of any hardware terminal device, which reduces the purchase and management expenses related to password management, greatly save costs, and effectively avoids a system security thread resulted from loss, failure, damage, or other problems of an external hardware terminal device. In addition, a limitation in use of the hardware terminal device is also effectively avoided, and password registration can be performed freely on various platforms on a PC or a mobile terminal without limitations by external physical conditions such as time and space.

BRIEF DESCRIPTION OF DRAWINGS

To describe the technical solutions in the embodiments of the present application more clearly, the accompanying drawings required for describing the embodiments are briefly described below. Apparently, those of ordinary skill in the art may still derive other drawings from these accompanying drawings without creative efforts.

FIG. 3 is a schematic diagram illustrating a full-element dynamic factor table with positioning factors of English letters according to an embodiment of the present application;

FIG. 4 is a schematic diagram illustrating a full-element dynamic factor table with positioning factors of numerals according to an embodiment of the present application;

FIG. 10 is a schematic diagram illustrating a positioning rule of combining of consecutive positioning factors according to an embodiment of the present application;

FIG. 11A, FIG. 11B, and FIG. 11C are schematic diagrams of three positioning rules of combining of non-consecutive positioning factors according to an embodiment of the present application;

FIG. 12 is a schematic diagram illustrating a positioning rule of combining of repeated positioning factors at the same location according to an embodiment of the present application;

FIG. 13 is a schematic diagram illustrating a positioning rule of combining of fixed characters according to an embodiment of the present application;

DESCRIPTION OF EMBODIMENTS

In order to make those skilled in the art understand the technical solutions in the present application better, the technical solutions in the embodiments of the present application are described below clearly and completely with reference to the accompanying drawings in conjunction with the embodiments of the present application. Apparently, the described embodiments are merely some rather than all of the embodiments of the present application. All other embodiments obtained by those of ordinary skill in the art based on the embodiments in the present application without creative efforts shall fall within the protection scope of the present application.

Figure 1:
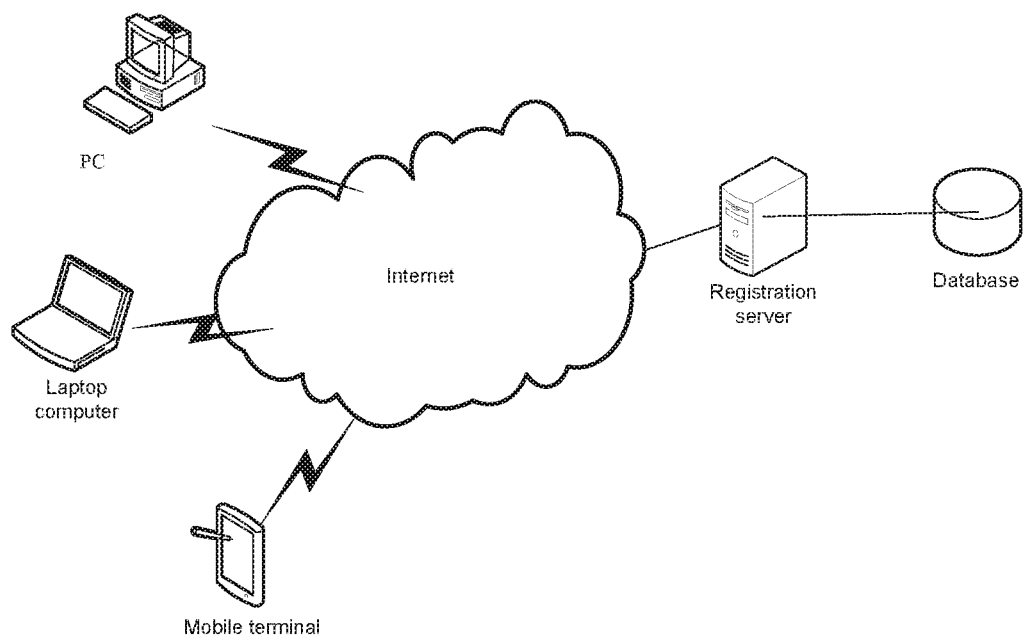
FIG. 1 is a schematic structural diagram illustrating a dynamic graphical password-based network registration system according to an embodiment of the present application.

FIG. 1 is a schematic structural diagram illustrating a dynamic graphical password-based network registration system provided in an embodiment. As shown in FIG. 1, a server includes a database. The database includes a positioning factor library. Alternatively, the positioning factor library is stored in an attribute file. The positioning factor library is configured to store positioning factors, and is an element set for generating a full-element dynamic factor table. The positioning factor library includes positioning factors of different types, such as English letter, word, Chinese character, numeral, symbol, image, color, or the like. The server may select, based on a registration request from a client, one or more types of positioning factors as selected positioning factors.

The server further includes a memory configured to store a user ID. Transmission between the server and the client is performed via the Internet. Specifically, the transmission between the client and the server is performed by communication link based on SSL (Secure Sockets Layer) protocol, thereby ensuring secure information communication. Alternatively, the server and the client may be connected via dedicated line instead of the Internet. In addition, the client described in this embodiment includes a terminal device, and may specifically include a PC, a palmtop computer, a mobile Internet device, or the like. These terminals are merely exemplary rather than exhaustive, and the client includes, but not limited to, these terminals.

Figure 2:
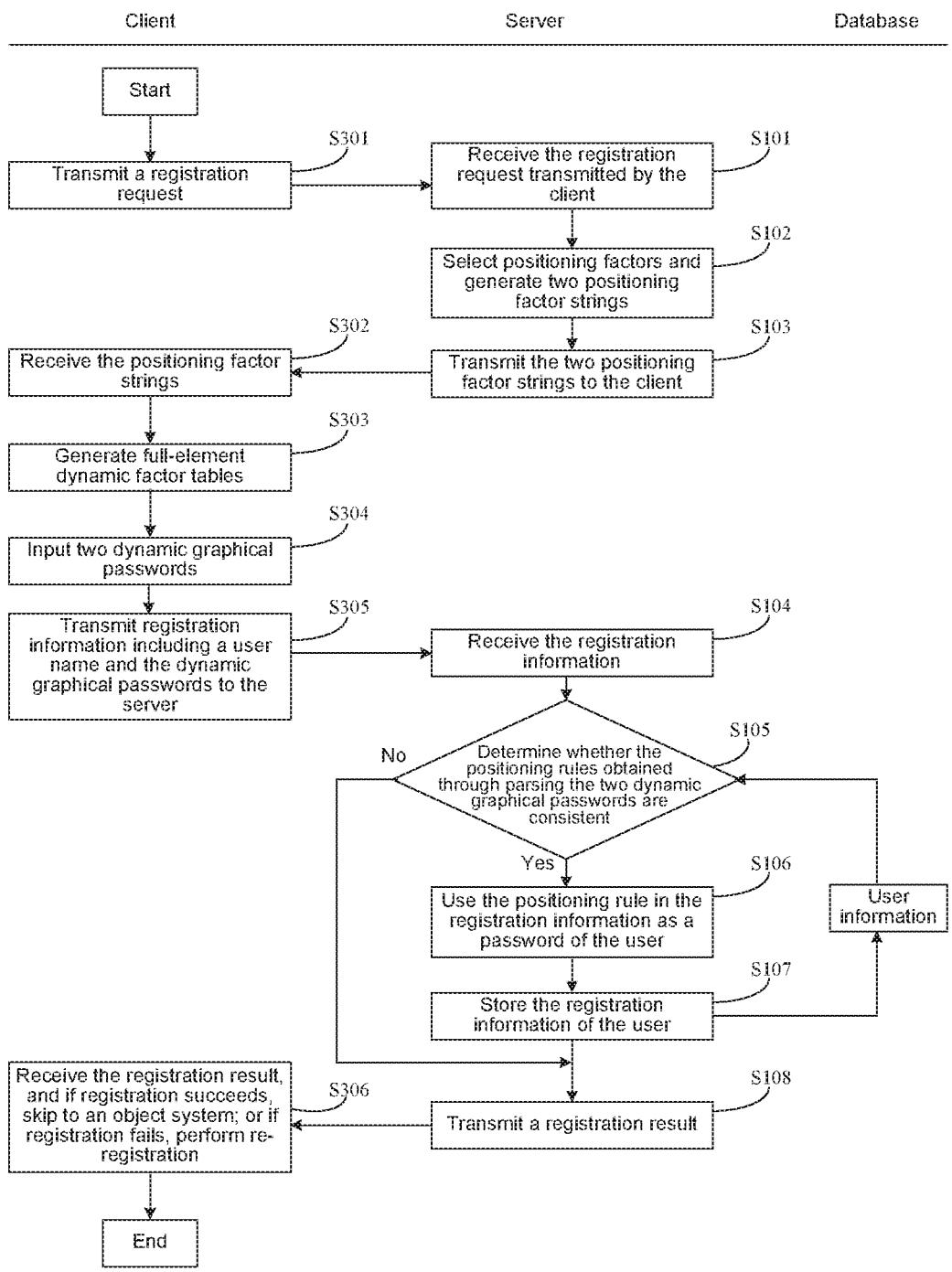
FIG. 2 is a flowchart of a dynamic graphical password-based network registration method according to an embodiment of the present application.

A dynamic graphical password-based network registration method is completely described below with reference to FIG. 2. As shown in FIG. 2, the registration method includes the following steps:

Step S301: A client transmits a registration request to a server, wherein the registration request includes a user ID. The user ID is used as the unique identifier of a user in the system. In this embodiment, the user ID is specifically an appellation of the unique identifier, such as user name, account, and login ID of the user in the system.

Step S101: The server receives the registration request transmitted by the client. The server communicates with the client via a network and SSL protocol, and receives a service request from the client.

Step S102: The server selects positioning factors from a positioning factor library, and generates two positioning factor strings.

Figures 4A, 5:
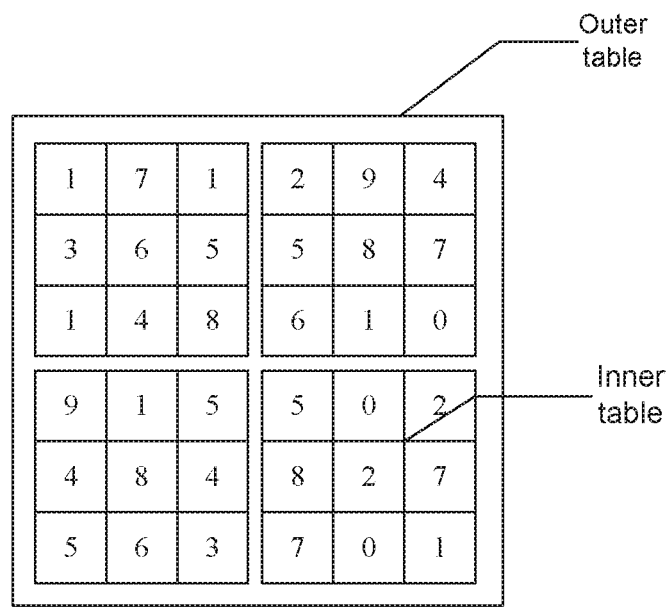
FIG. 4A is a schematic diagram illustrating a full-element dynamic factor table with positioning factors of a hybrid of numerals and English letters according to an embodiment of the present application.
FIG. 5 is a schematic diagram illustrating a full-element dynamic factor table with an inner table and an outer table according to an embodiment of the present application.

The full-element dynamic factor table is a display mode for prompt, which is formed by the selected positioning factors and positioning factors. The positioning factors in the full-element dynamic factor table, which are the positioning factors selected from the positioning factor library, may change freely and are not fixed. FIG. 3 is a schematic diagram illustrating a full-element dynamic factor table. In the table, all the selected positioning factors are English letters. FIG. 4 is a schematic diagram illustrating another full-element dynamic factor table. In the table, all the selected positioning factors are Arabic numerals. The positioning factors further include one of or a combination of more of English letters, words, Chinese characters, numerals, symbols, images, and colors. As shown in FIG. 4A, the full-element dynamic factor table includes a combination of English letters and numerals, which can further increase the hardness of the full-element dynamic factor table, thereby improving the anti-counterfeiting performance.

Preferably, the structure of the full-element dynamic factor table, as well as the difficulty coefficient of the full-element dynamic factor table, may be determined through negotiation between the client and the server. For example, as shown in FIG. 3, the positioning factors selected by a user are in a 6*6 positioning factor display mode. Taking a 6-digit password as an example, the number of positioning graphic combinations of single-type positioning factors is 36 to the power of 6 (i.e., $36^6$). If a 10-digit password is selected for use, the cracking probability of the password is one in 3.656158e+15, i.e., one in $36^{10}$. If the positioning factors are used in combination of fixed characters, the cracking probability will be lower. Alternatively, a 9*9 positioning factor display mode may be selected. As the positioning factors are the more, the password has the higher complexity and the higher anti-counterfeiting performance.

Through negotiation between the client and the server, the user can select an individualized full-element dynamic factor table depending on an individual condition, so as to enhance the randomness and uniqueness of the full-element dynamic factor table. Because different users have different preferences, the positioning factors selected by the server based on the preferences of the users are also different, and different full-element dynamic factor tables are generated.

Figure 6:
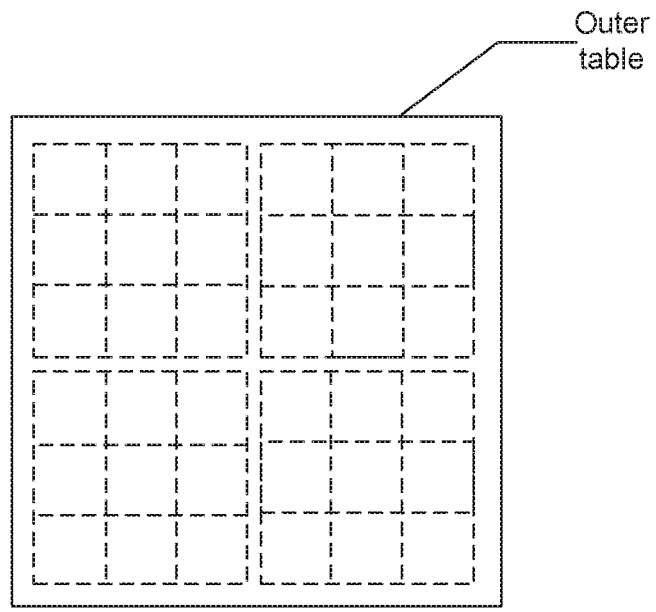
FIG. 6 is a schematic diagram illustrating a full-element dynamic factor table with a regular outer table according to an embodiment of the present application.
Figure 7:
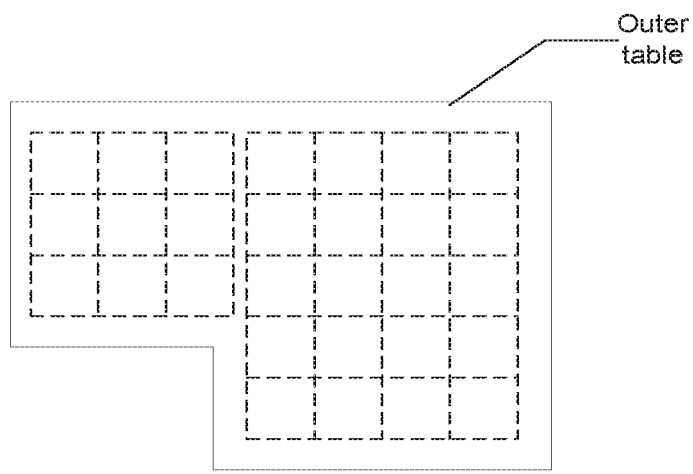
FIG. 7 is a schematic diagram illustrating a full-element dynamic factor table with an irregular outer table according to an embodiment of the present application.
Figure 8:
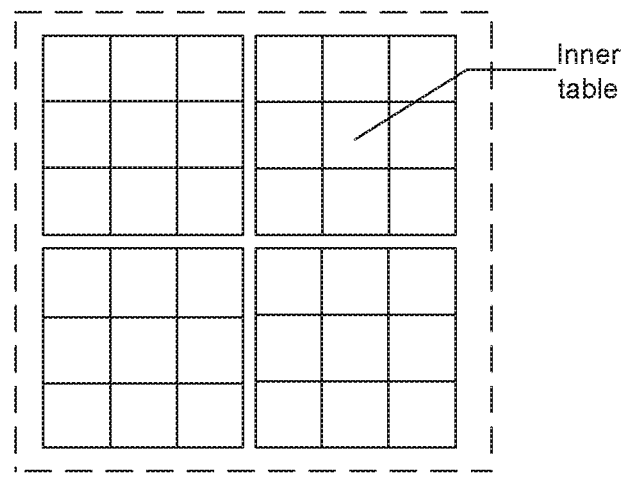
FIG. 8 is a schematic diagram illustrating a full-element dynamic factor table with a regular inner table according to an embodiment of the present application.
Figure 9:
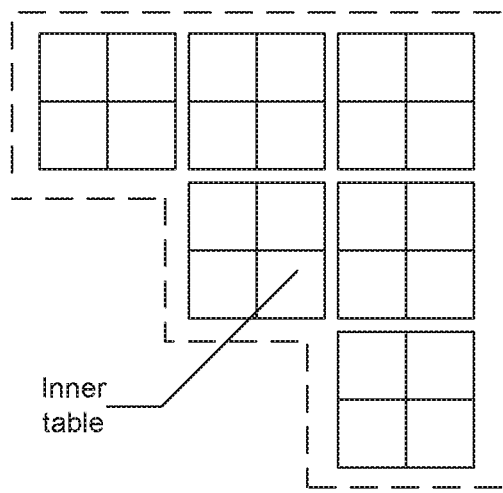
FIG. 9 is a schematic diagram illustrating a full-element dynamic factor table with an irregular inner table according to an embodiment of the present application.

In step S102, the structure of the full-element dynamic factor table includes an outer table and an inner table. As shown in FIG. 5, the outer table is composed of at least one inner table, and each inner table includes a plurality of positioning factors. The outer table is not only the external physical shape of the full-element dynamic factor table, but also a concept table including various inner tables and having a table appearance. Moreover, the shape of the outer table is not fixed, which may be a regular shape, as shown in FIG. 6, or an irregular shape, as shown in FIG. 7. The inner table is a separately divided sub-table in the full-element dynamic factor table and may be formed in various modes. The inner table may be a combination in a regular shape, or a combination in an irregular shape, as shown in FIG. 8 and FIG. 9, the inner tables in regular and irregular shapes are respectively shown. The specific shapes of the outer table and the inner table may be determined through negotiation between the server and the client, or the server automatically generates a positioning factor string according to a preset program. The positioning factor string is a data character string converted from the content of the full-element dynamic factor table.

In this embodiment, in order to ensure the reliability of the password, the user needs to input two dynamic graphical passwords. Therefore, the server correspondingly generates two sets of positioning factors, and then generates two positioning factor strings based on a special algorithm. The special algorithm includes a formula, a random permutation-combination, or a set unified algorithm.

Specifically, for example, the positioning factors selected by the user through negotiation between the client and the server are of only a numeral type, and the outer table structure and the inner table structure of the full-element dynamic factor table are both regular structures, where the outer table includes four 3*3 inner tables, and each inner table includes 9 positioning factors. The positioning factors selected by the server from the positioning factor library based on the outer table structure, the inner table structure, the outer table structure parameter, and the inner table structure parameter are 10 Arabic numerals, namely 0 to 9. Taking 6*6 as an example, the selected positioning factors are Arabic numerals, and each positioning factor string generated by the server includes 36 numerals. After receiving the positioning factor string composed of 36 numerals from the server, the client maps the numerals in the positioning factor string into the full-element dynamic factor table based on the structure of the full-element dynamic factor table.

As shown in FIG. 2, the method further includes: Step S103: The server transmits the generated two positioning factor strings to the client. The two positioning factor strings, which may be the same or different, are simultaneously transmitted to the client.

Step S302: The client receives the positioning factor strings transmitted by the server.

Step S303: The full-element dynamic factor tables are generated based on the two positioning factor strings from the server. Because the client needs to input, when a user registers, two dynamic graphical passwords based on two full-element dynamic factor tables to confirm the positioning graphic used as the password, the client needs to first transmit a dynamic graphical password request, i.e., a registration request, to the server to instruct the server to generate the positioning factor strings, and the client can generate the full-element dynamic factor tables only after receiving the positioning factor strings returned by the server.

Figures 10, 11A, 11B:
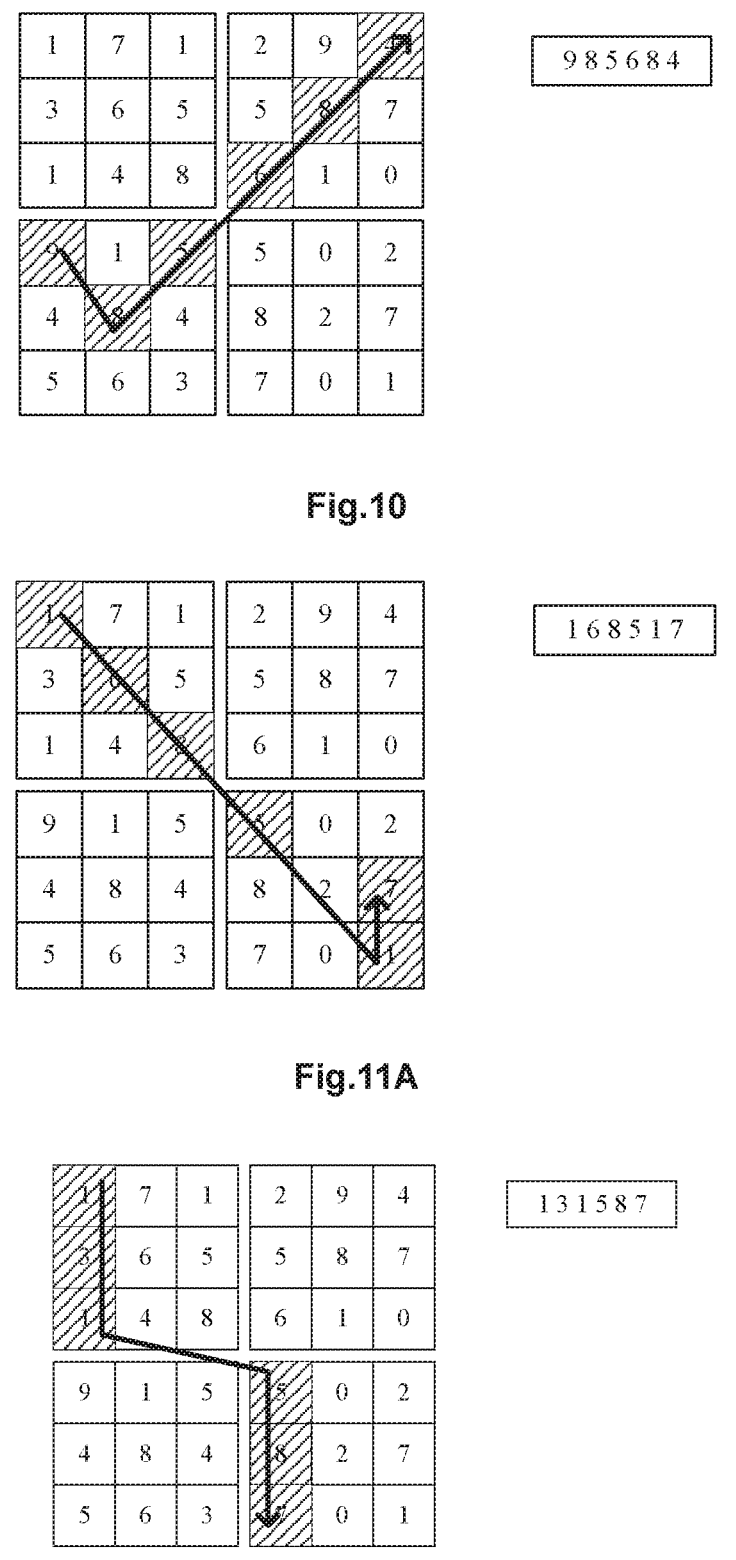

The client generates the full-element dynamic factor tables based on the outer table structure and the inner table structure of the full-element dynamic factor table, and the positioning factor strings generated based on the positioning factors selected from the positioning factor library. As shown in FIG. 10, the positioning factor strings generated in step S102 are mapped into the full-element dynamic factor table, and each positioning factor appears at least twice in the full-element dynamic factor table, so as to reduce the cracking probability, and enhance the randomness and anti-counterfeiting performance of the positioning factors in the full-element dynamic factor table.

Step S304: A user inputs two dynamic graphical passwords based on the full-element dynamic factor tables. Specifically, step S304 includes the following steps:

Step S3041: The client displays a first full-element dynamic factor table, wherein the client maps a first positioning factor string into the full-element dynamic factor table to generate the first full-element dynamic factor table.

Step S3042: The user inputs a first dynamic graphical password. The user inputs the first dynamic graphical password in the first full-element dynamic factor table according to a positioning rule set in mind.

Step S3043: After inputting the first dynamic graphical password, the client displays a second full-element dynamic factor table, and maps a second positioning factor string from the server into the second full-element dynamic factor table.

Figures 11C, 12, 13:
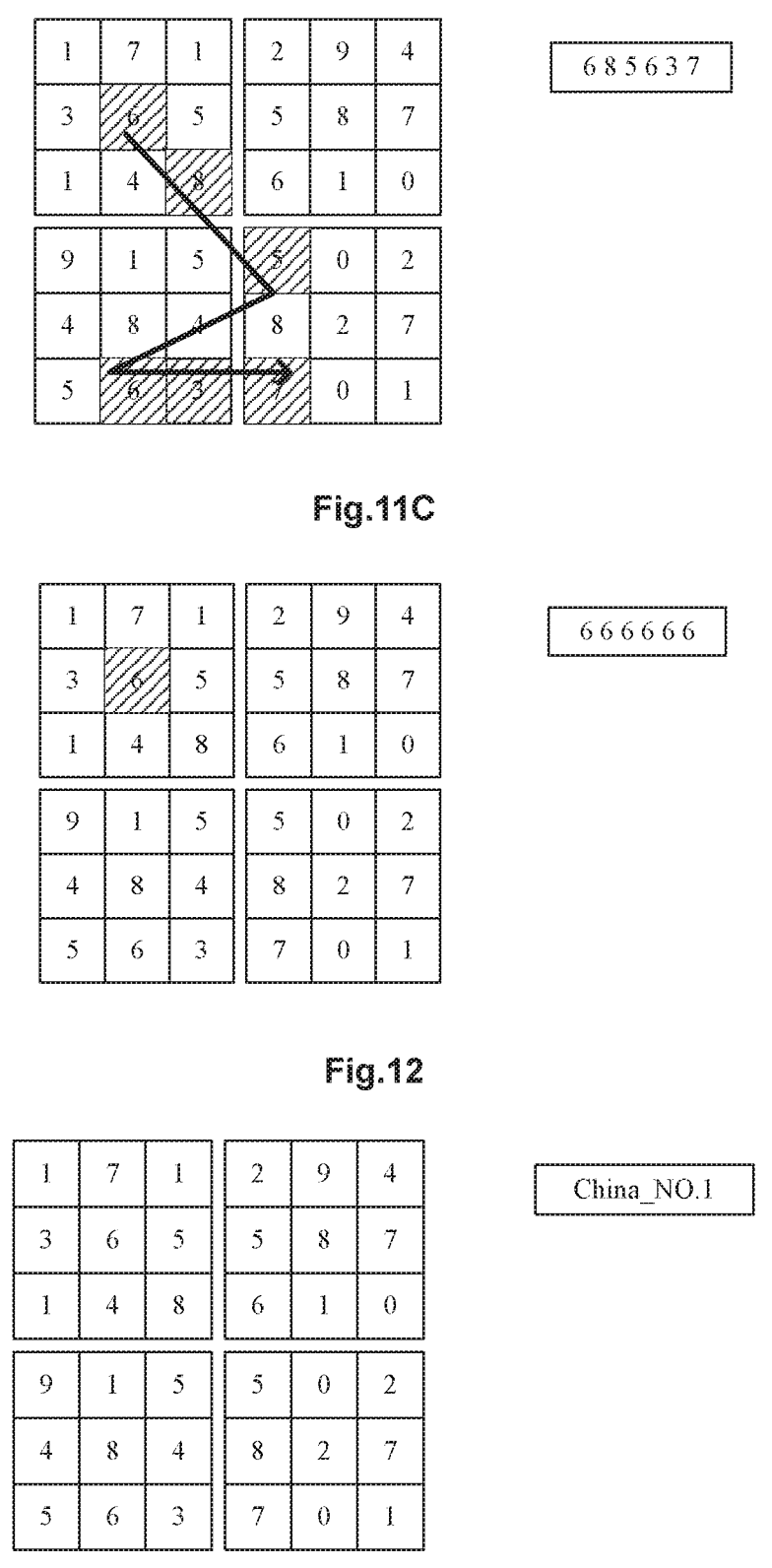
Figure 14A:
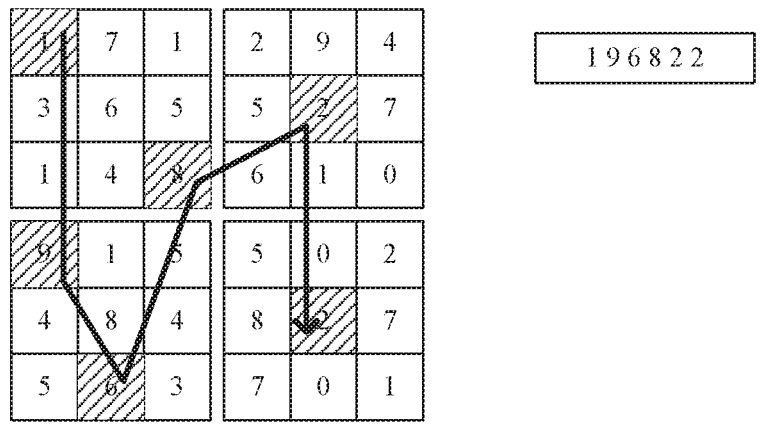
FIG. 14A and FIG. 14B are schematic diagrams illustrating two positioning rules of combining of distributed positioning factors according to an embodiment of the present application.
Figure 14B:
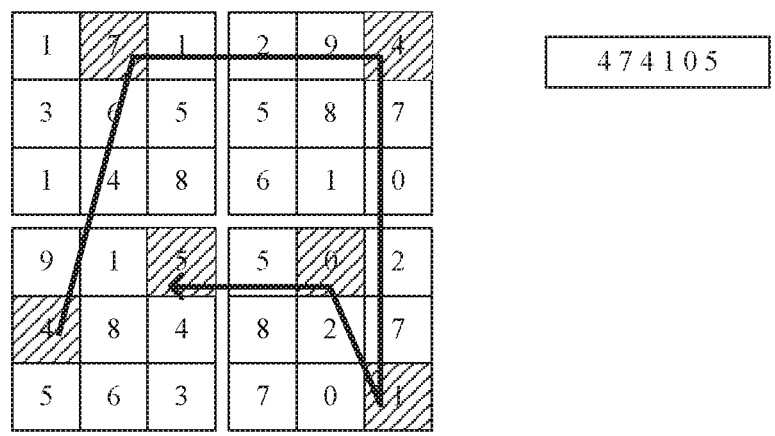
Figure 15:
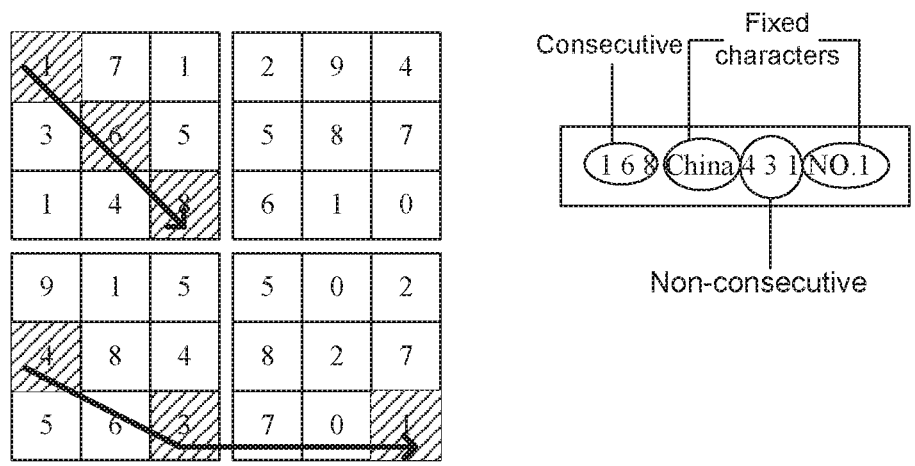
FIG. 15 is a schematic diagram illustrating a positioning rule of combining of a plurality of forms according to an embodiment of the present application.

Preferably, each of the dynamic graphical passwords includes a positioning graphic formed by at least one positioning factor according to a positioning rule, and the positioning rule includes one of combining of consecutive positioning factors, combining of non-consecutive positioning factors, combining of repeated positioning factors at the same location, and combining of fixed characters, or any combination thereof. FIG. 10 shows a (consecutive) positioning rule of combining consecutive positioning factors, where all the positioning factors are consecutive. FIG. 11A, FIG. 11B, and FIG. 11C show (non-consecutive) positioning rules of combining non-consecutive positioning factors, where positioning factors in a dynamic graphical password are inconsecutive, between which there is a hop. FIG. 12 shows a (single-point) positioning rule of combining repeated positioning factors at the same location, i.e., combining of repeated single positioning factors. FIG. 13 shows a positioning rule of combining fixed characters. As shown in FIG. 13, a dynamic graphical password includes the fixed characters "China_NO.1" preset by the user. In addition, the positioning rule further includes combining of distributed positioning factors, as shown in FIG. 14A and FIG. 14B. The dynamic graphical password may also be based on a combination of one or more of positioning rules above. For example, as shown in FIG. 15, the dynamic graphical password is a combination of consecutive positioning factors, non-consecutive positioning factors, and fixed characters, which is "168 China 431 NO.1" upon combination.

Back to FIG. 2, the registration method provided according to this embodiment further includes step S305: The client transmits registration information including a user name and the dynamic graphical passwords to the server. After the second dynamic graphical password is input, the client transmits personal information, such as the two dynamic graphical passwords and an user ID, as registration information to the server. After inputting the user name and the two dynamic graphical passwords on the client, the user taps on the "ENTER" key to transmit the registration information to the server. Alternatively, after the user inputs the two dynamic graphical passwords, the client automatically transmits the registration information to the server. If the server determines that the registration information is complete, i.e., the registration information includes the user name and the two dynamic graphical passwords, the process proceeds to step S106. If the registration information is incomplete, error information is transmitted to the client, and the client re-inputs registration information.

Step S104: The server receives the registration information from the client. In addition to the personal information such as the two dynamic graphical passwords and the user name, the registration information further includes other information of the user, e.g., information such as ID number of the user and a registered photo.

Step S105: The server determines whether the positioning rules obtained by parsing the two dynamic graphical passwords in the registration information are consistent. Specifically, the dynamic graphical passwords are parsed for the positioning rules, and it is determined whether the two positioning rules are the same. If the two positioning rules obtained through parsing are the same, it indicates that the two positioning rules obtained through parsing are consistent, otherwise, it indicates that the two dynamic graphical passwords in the registration information are different.

Figure 16:
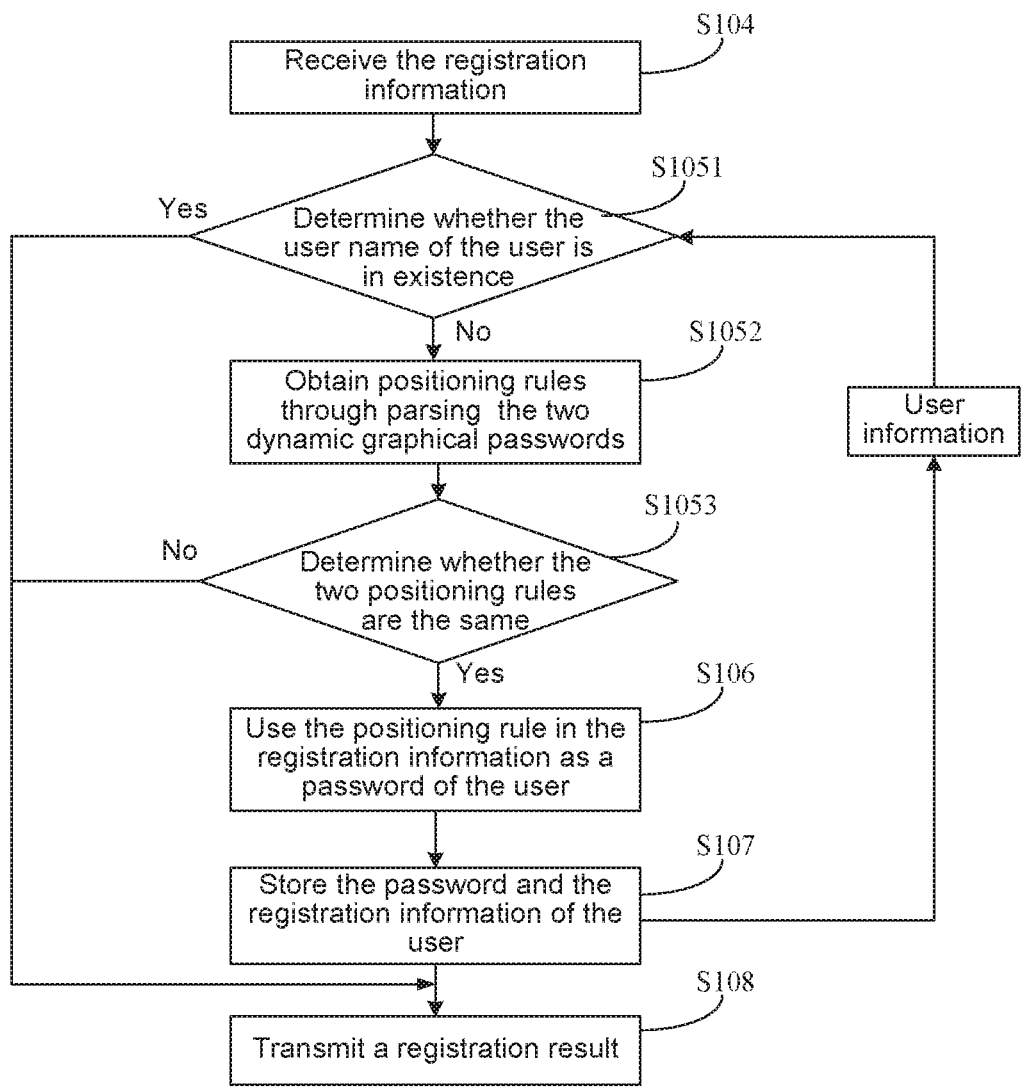
FIG. 16 is a partial flowchart of a dynamic graphical password-based network registration method according to an embodiment of the present application.

Preferably, before step S105, the method further includes the following steps as shown in FIG. 16:

Step S1051: A registration server determines whether the user name received from the client is in existence. If the user name is not in existence, it indicates that the user is a new user, the server allows registration. Otherwise, the user is an old user, and the server does not allow the same user name to be repeatedly registered. Therefore, the registration of the user fails, and the process skips to step S108.

Step S1052: The server performs parsing for the positioning rules corresponding to the two received dynamic graphical passwords. Specifically, parsing is performed by a software for the positioning rules, and one positioning rule is obtained by parsing each dynamic graphical password input by the user. The positioning rule is an action track of the user in the full-element dynamic factor table when the user inputs a dynamic graphical password. In order to differentiate the action tracks of the two dynamic graphical passwords, in this embodiment, the positioning rule corresponding to the dynamic graphical password input by the user at the first time is named as a first positioning rule, and the positioning rule corresponding to the dynamic graphical password input by the user at the second time is named as a second positioning rule.

The positioning rule refers to an action mechanism when the user sets a password based on the full-element dynamic factor table. The rule obtained through parsing in view of the action mechanism includes the following several modes:

a) single-point mode, in which a point at the same location or one point is repeatedly selected (as shown in FIG. 12);

b) distributed mode, in which all positioning points in the full-element dynamic factor table are distributed (as shown in FIG. 14A and FIG. 14B);

c) consecutive mode, in which all positioning points are consecutive (as shown in FIG. 10);

d) non-consecutive mode, in which most of the positioning points are consecutive, and the positioning points also include non-consecutive points (as shown in FIG. 11A, FIG. 11B, and FIG. 11C);

e) fixed-character (e.g., character, numeral, or symbol) mode, in which no point in the full-element dynamic factor table is selected, and conventional fixed characters are directly input (as shown in FIG. 13); and f) any combination of the modes above, in which the above rules can be freely combined for use (as shown in FIG. 15).

Preferably, before step S1051 or step S105, the method further includes: receiving relevant user information such as identity information of the user and picture information.

Step S1053: It is determined whether the two positioning rules are the same or consistent, that is, it is determined whether the action tracks of the first positioning rule and the second positioning rule are the same. Each positioning factor corresponds to one coordinate location in the full-element dynamic factor table. The server can obtain the action tracks for the dynamic graphical passwords input by the user through identifying the coordinate locations corresponding to the positioning rules, so as to determine whether the first positioning rule and the second positioning rule respectively corresponding to the two action tracks are the same.

If the first positioning rule is the same as the second positioning rule, the registration of the user succeeds, and performing step S106: using the positioning rule in the registration information as the password registered by the user.

If the first positioning rule is different from the second positioning rule are, or the identified password input on the client is illegal or the positioning rule of the user cannot be computed, the registration of the user fails, and the server transmits a registration failure result to the client, to instruct the user on the client side to refill in registration information.

As shown in FIG. 2 or FIG. 16, the method further includes: step S107: the two dynamic graphical passwords along with the positioning rules and the registration information of the user are stored, and a registration result is generated.

Step S108: The server transmits the registration result to the client via a network.

As shown in FIG. 2, the method further includes: Step S306: receiving by the client the registration result from the server, and if the registration result is correct, turning to an object system, and the registration is completed; or if the registration result indicates a failure, returning to a registration interface, and performing re-registration by the user.

As can be seen from the foregoing technical solutions, the method and system for network registration based on dynamic graphical password provided according to the embodiments have the following beneficial effects:

1. When the user performs registration on the client, the user respectively inputs two dynamic graphical passwords having a specific positioning rule in full-element dynamic factor tables into which positioning factor strings are mapped, and the positioning rule corresponding to the input dynamic graphical passwords is used as the password stored for the user. The dynamic graphical password is formed by a positioning graphic, and therefore the user needs to remember only the positioning graphic, which is equivalent to remembering the password. The password is easy to remember, and not easy to forget, as compared with a conventional password consisting of numerals or characters.

2. Because a different positioning factor string is generated by the server each time, a different full-element dynamic factor table is displayed to the user. A fixed positioning rule is used by the user to input a dynamic graphical password, and accordingly a different password is input based on a full-element dynamic factor table. Therefore, the input of password is not afraid of peep, and even intrusion or interception of viruses such as Trojan, phishing, and the like, and such an input of password can be performed freely in various scenarios.

3. The types of the positioning factors in the positioning factor library include: English letter, word, Chinese character, numeral, symbol, image, color, etc., which improves the randomness and anti-counterfeiting performance of the full-element dynamic factor table. The dynamic graphical password set by the user includes a combination of consecutive positioning factors, a combination of non-consecutive positioning factors, a combination of repeated positioning factors at the same location, conventional fixed characters, and any combination thereof. Therefore, the flexibility and diversification of the dynamic graphical password are further enhanced, and the dynamic graphical password has a low repetition rate and an increased complexity, which makes it harder to crack a registered dynamic graphical password.

4. Transmission is performed between the client and the server over a secure SSL communication link, and data transmitted is encrypted data. Moreover, the full-element dynamic factor table and the input dynamic graphical password change each time. Therefore, even if the input dynamic graphical password is intercepted, the real positioning graphic of the user still cannot be cracked. Therefore, it is possible that the dynamic graphical password is immune against interception and crack, having high anti-counterfeiting performance and high security.

5. The dynamic graphical password input by the user is implemented by means of software, independent of any hardware terminal device, which reduces the purchase and management expenses related to password management, greatly save costs, and effectively avoids a system security thread resulted from loss, failure, damage, or other problems of an external hardware terminal device. In addition, a limitation in use of the hardware terminal device is also effectively avoided, and password registration can be performed freely on various platforms on a PC or a mobile terminal without limitations by external physical conditions such as time and space.

In addition, when setting a password, the user is restricted little, not like setting of a conventional password, and the user is given the initiative to set a password, which improves the interestingness and enhances the user experience.

Through such a new manner of user registration based on dynamic graphical password, the security of the entire Internet system is improved. For enterprises, a secure Internet system can be created for users, both of the PCs and mobile terminals can support this new registration manner, and the password-related IT management expenses can be reduced, thereby increasing net profits of the enterprises.

In a preferred technical solution of the foregoing embodiment, in order to further enhance the anti-counterfeiting performance of the dynamic graphical passwords, the method further includes that the client and the server negotiates an identification rule of the inner table, or a change rule of distribution of the inner table in the outer table. The distribution change rule of the inner table includes: a clockwise change rule, a counterclockwise change rule, or a random change rule.

Figure 17:
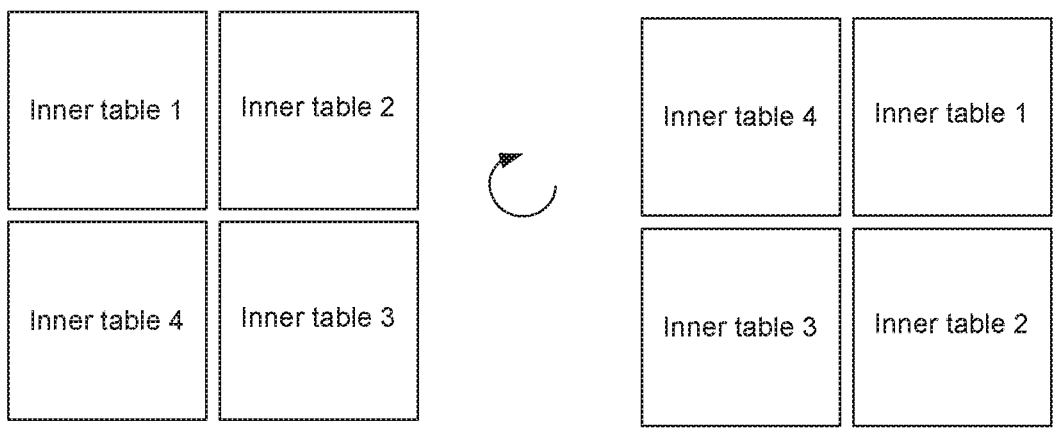
FIG. 17 is a schematic diagram illustrating clockwise rotation change of an inner table in a full-element dynamic factor table according to an embodiment of the present application.
Figure 18:
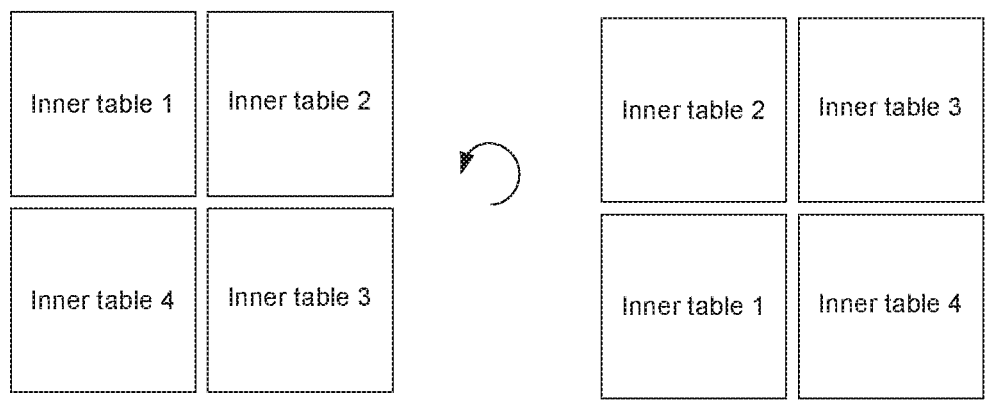
FIG. 18 is a schematic diagram illustrating counterclockwise rotation change of an inner table in a full-element dynamic factor table according to an embodiment of the present application.
Figure 19:
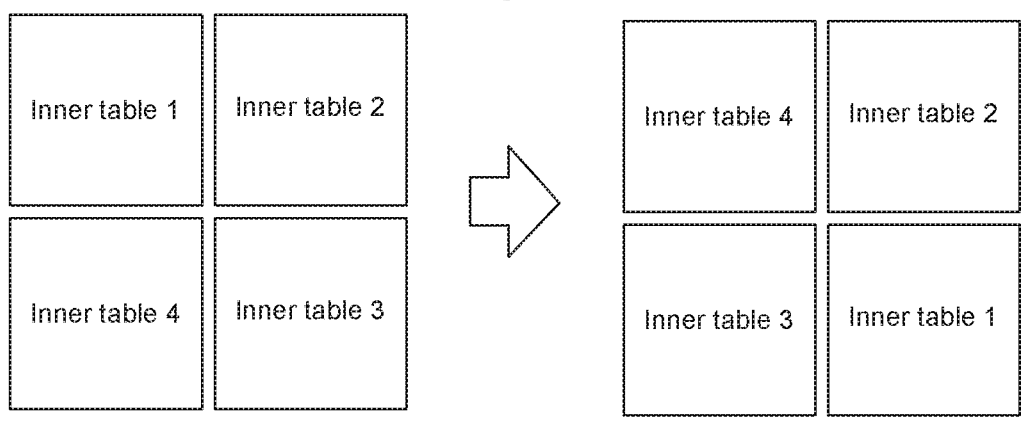
FIG. 19 is a schematic diagram illustrating random rotation change of an inner table in a full-element dynamic factor table according to an embodiment of the present application.

As shown in FIG. 17, FIG. 18, and FIG. 19, FIG. 17 is a schematic diagram illustrating clockwise change of inner tables in a full-element dynamic factor table as preset; FIG. 18 is a schematic diagram illustrating counterclockwise change of four inner tables in the full-element dynamic factor table; and FIG. 19 is a schematic diagram illustrating random change of inner tables in the full-element dynamic factor table.

The embodiment of the present application is directed to a registration processing based on a one-time dynamic graphical password. The user may autonomously register a positioning rule in the full-element dynamic factor table, and the positioning rule as the password of the user is logged in a database. The change/rotation manner of the inner table structure is preset in the system, or is autonomously set by the user when the user inputs the dynamic graphical password on the client.

Figure 20:
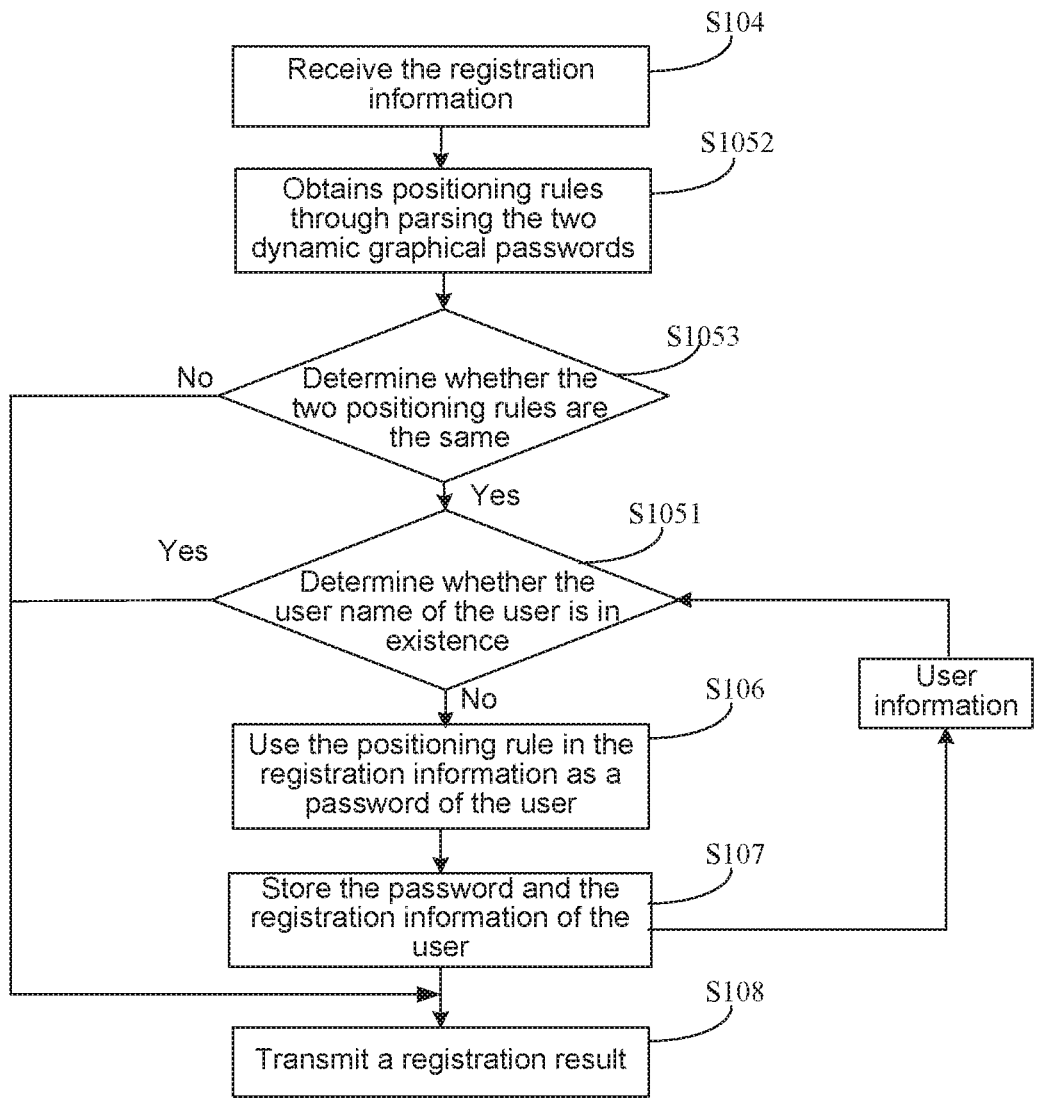
FIG. 20 is a partial flowchart of another dynamic graphical password-based network registration method according to an embodiment of the present application.

In the foregoing embodiment, step S1051 may exchange order with step S1052 along with S1053. As shown in FIG. 20, a process of determining whether the received registration information is correct includes the following steps:

Step S1052: The positioning rules are obtained through parsing the two dynamic graphical passwords.

Step S1053: It is determined whether the two positioning rules obtained through parsing are the same. If the two positioning rules are the same, proceeding to step S1051; or if the two positioning rules are different, proceeding to step S108.

Step S1051: It is determined whether the user name of the user is in existence. If the user name is not in existence, proceeding to step S106. If the user name is in existence, proceeding to step S108.

In an embodiment, the server firstly verifies whether the positioning rules obtained through parsing are correct, and then determines whether the user name is in existence, so that the time consumed can be saved as compared with the case that the user name is firstly verified and correctness of the positioning rules is then verified. Moreover, with the increase of user names, there may appear a very similar or a same user name in the system, resulting in an error in the verification operation of the server and affecting the registration result. Therefore, in this embodiment, it is possible to avoid the error occurring when the server verifies user name, where a verification failure result is immediately transmitted to the client once the positioning rule is verified as being incorrect.

In addition, in an embodiment, a positioning graphic is set as the user name for user registration, but a conventional password is still used as the password. In this manner, it is not only that the user can retain an original use habit, i.e., still using a conventional password, but also that the security of user information can be enhanced, because the user name is a positioning graphic, which has high security, is hard to guess and crack, is easy to remember, and is not afraid of peeping, although the password is still a conventional password, which is easy to crack. Because the user name is in the form of a positioning graphic, which is hard to crack, even if the password is leaked, the cracker cannot log in to an Internet application, the information of the user will not be lost, and the security can meet a requirement.

Figure 21:
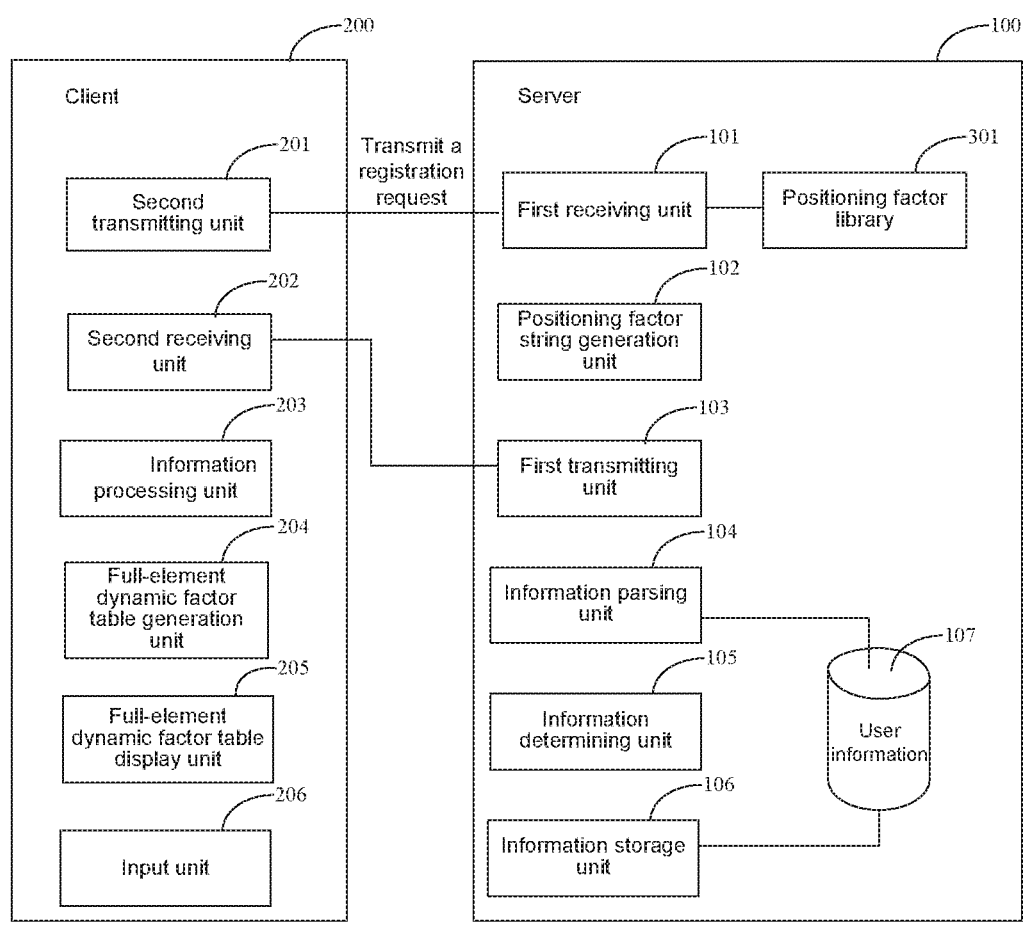
FIG. 21 is a structural block diagram illustrating a dynamic graphical password-based network registration system according to an embodiment of the present application.

Corresponding to the embodiment of the dynamic graphical password-based network registration method, an embodiment of the present disclosure further provides a dynamic graphical password-based network registration system. With reference to FIG. 1 and FIG. 21, the system includes: a server 100 providing a registration service for a network access user, a client 200 that is connected to the server via a network and provides network registration for the user, and a positioning factor library 301.

The server 100 includes: a first receiving unit 101 configured to receive information from the client, a first transmitting unit 103 configured to transmit information to the client, and a positioning factor string generation unit 102, an information parsing unit 104, and an information determining unit 105 that are connected to the first receiving unit and the first transmitting unit.

The positioning factor string generation unit 102 is configured to generate two positioning factor strings based on positioning factors selected from the positioning factor library, and transmit the generated two positioning factor strings to the client 200 through the first transmitting unit 103.

The information parsing unit 104 is configured to parse two dynamic graphical passwords to obtain the positioning rules corresponding to the two dynamic graphical passwords.

The information determining unit 105 is configured to determine that the positioning rules obtained through parsing the two dynamic graphical passwords are consistent, and store the positioning rule in registration information as the password of the user. The information determining unit 105 further includes: a user name determining unit, configured to determine whether the user name input by the user is in existence, specifically determine whether the current user name transmitted by the client is the same as a user name in a user database. If the user names are different, the information parsing unit further parses the two dynamic graphical passwords to obtain two positioning rules. If the user names are the same, the server transmits a registration failure result to the client.

It should be noted that the client and the server in this embodiment may be two different devices or apparatuses, or may be integrated in one device or apparatus.

If the functions of the client and the server are integrated in one device or apparatus, e.g., a stand-alone PC or mobile terminal, an offline mode or mechanism is formed, in which the terminal such as the device or the apparatus itself can independently perform registration independent of network communication. In this case, the terminal in the system includes a server unit, a client unit, and a positioning factor library unit. Moreover, the server unit, the client unit, and the positioning factor library unit have the same functions as the server 100, the client 200, and the positioning factor library 301, respectively.

In addition, the manner in which the information parsing unit determines whether the first positioning rule and the second positioning rule obtained through parsing the two dynamic graphical passwords is the same as that in the foregoing embodiment, and the details thereof are not described repeatedly herein.

The client 200 includes: a second receiving unit 202 configured to receive information from the server, a second transmitting unit 201 configured to transmit information to the server, and an information processing unit 203 connected to the second receiving unit 202 and the second transmitting unit 201.

The information processing unit 203 is configured to generate a full-element dynamic factor table based on the structure of the full-element dynamic factor table and the positioning factor string, and receive the two dynamic graphical passwords input by the user based on the full-element dynamic factor table, and transmit the registration information including the user name and the dynamic graphical passwords to the server 100 through the second transmitting unit 201.

The positioning factor library 301 is included in a database. The database may further include a user information library. The user information library is configured to store related information of the user, e.g., ID number information and photo information of the user. Alternatively, the positioning factor library 301 may also be integrated into the server 100.

Preferably, the types of the positioning factors in the positioning factor library include English letter, word, Chinese character, numeral, symbol, image, or color.

The client 200 further includes a full-element dynamic factor table generation unit 204, a full-element dynamic factor table display unit 205, and an input unit 206.

The full-element dynamic factor table generation unit 204 is configured to generate the full-element dynamic factor table based on the structure of the full-element dynamic factor and the positioning factor string.

The full-element dynamic factor table display unit 205 is configured to display the full-element dynamic factor table.

The input unit 206 is configured to input the two dynamic graphical passwords on the display unit 205 based on the full-element dynamic factor table, and input related user information such as user ID.

The server 100 further includes an information storage unit 106 and user information 107.

The information storage unit 106 is configured to store related information such as the two dynamic graphical passwords and the user name after the registration of the user succeeds, and is further configured to store the positioning factor strings generated by the server.

To overcome the disadvantages of prior forms of password on the Internet, this embodiment mainly provides a dynamic graphical password-based network registration system, which combines the advantages of graphical password and dynamic password and uses a positioning graphic as the password of a user. As a result, the user only needs to remember a graphic rather than a complex character string of a password, such that the password is simple and easy to remember, and will not be easily forgotten even after a long time elapses.

When setting a password, the user is restricted little, not like setting of a conventional password, and the user is given the initiative to set a password, which improves the interestingness and enhances the user experience.

In the full-element dynamic factor table, the positioning graphic set by the user may be a combination of consecutive positioning factors, a combination of non-consecutive positioning factors, a combination of repeated positioning factors at the same location, conventional fixed characters, or even any combination thereof, so that the positioning graphics are flexible and diversified, and have a low repetition rate, and thus the probability of cracking a password is greatly reduced.

A different full-element dynamic factor table is presented each time, and thus a different password is input each time based on the positioning graphic. In this way, it is possible that the input of password is not afraid of peep, nor is password transmission afraid of interception, thus providing a high security.

Due to implementation by means of only software, independent of any hardware terminal device, password registration can be performed freely on various platforms on a PC or a mobile terminal without limitations by external physical conditions such as time and space, and the purchase and maintenance costs of terminal device are reduced to a minimum.

Through such a new dynamic graphical password-based user registration manner, the security of the entire Internet system is improved. For enterprises, a secure Internet system can be created for users, both of the PCs and mobile terminals can support this new registration manner, and the password-related IT management expenses can be reduced, thereby increasing net profits of the enterprises. For individual users, it is unnecessary to memorize a complex password during registration, so that the trouble in password memorizing is eliminated; in addition, the risk of password being stolen and cracked can be effectively reduced, thereby reducing the danger of information leakage, and reducing the economic loss caused by information security.

Figure 22:
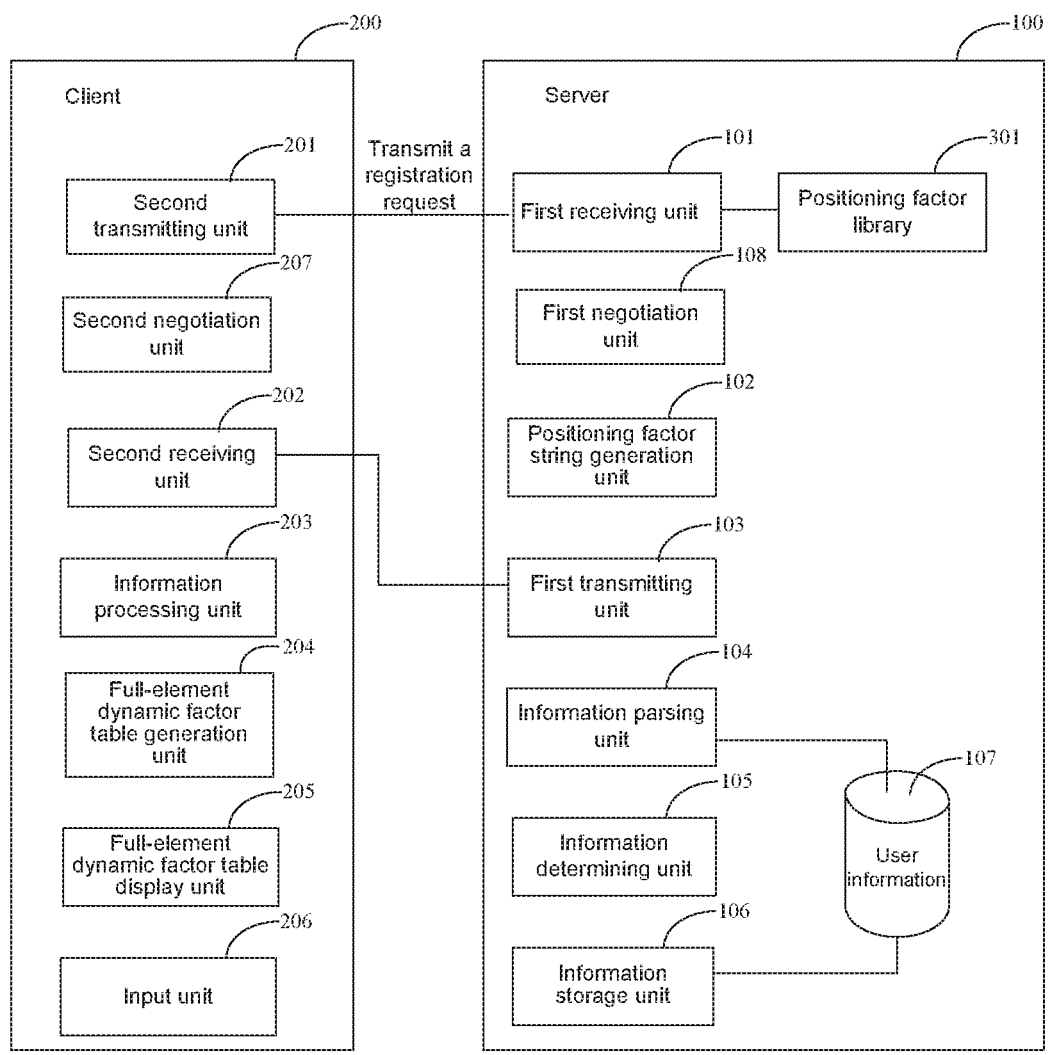
FIG. 22 is a structural block diagram illustrating another dynamic graphical password-based network registration system according to an embodiment of the present application.

In a preferred implementation manner of this embodiment, as shown in FIG. 22, between the first receiving unit 101 and the first transmitting unit 103, the server 100 further includes a first negotiation unit 108 configured to negotiate the structure of the structure of the full-element dynamic factor table with the client. The first negotiation unit 108 is configured to negotiate an outer table structure and an inner table structure of the full-element dynamic factor table, a difficulty coefficient of an inner table, a positioning factor type, a combination mode of the positioning factor strings, etc.

In addition, between the second receiving unit 202 and the second transmitting unit 201, the client 200 further includes a second negotiation unit 207 configured to negotiate the structure of the full-element dynamic factor table with the server. The second negotiation unit 207 is configured to cooperate with the first negotiation unit 108 to achieve personalization and diversification of the client during user registration, thereby enhancing the uniqueness of the registered user, increasing the recognition degree of individuals, and further improving the anti-counterfeiting function.

Corresponding to the dynamic graphical password-based network registration method (referred to as a first registration method for short hereinafter), an embodiment of the present application further provides another dynamic graphical password-based network registration method (referred to as a second registration method for short hereinafter).

The main difference between the second registration method provided in the embodiment of the present application and the first registration method is that it is on the client that the positioning factors are selected and the positioning factor strings are generated in the second registration method, while it is on the server that the positioning factors are selected and the positioning factor strings are generated in the first registration method.

In the first registration method, the server needs to perform computing processing, and therefore some computing resources of the server need to be occupied. When a large number of users perform network registration, this processing manner will greatly affects the server performance. To resolve this problem, a second registration method is provided in the embodiment of the present application, wherein the positioning factors are selected and the positioning factor strings are generated on the client. In this processing manner, the computing resources of the client are fully utilized to effectively share the computing tasks of the server. Therefore, the consumption of computing resources of the server can be effectively reduced, thereby improving the server performance.

Figure 23:
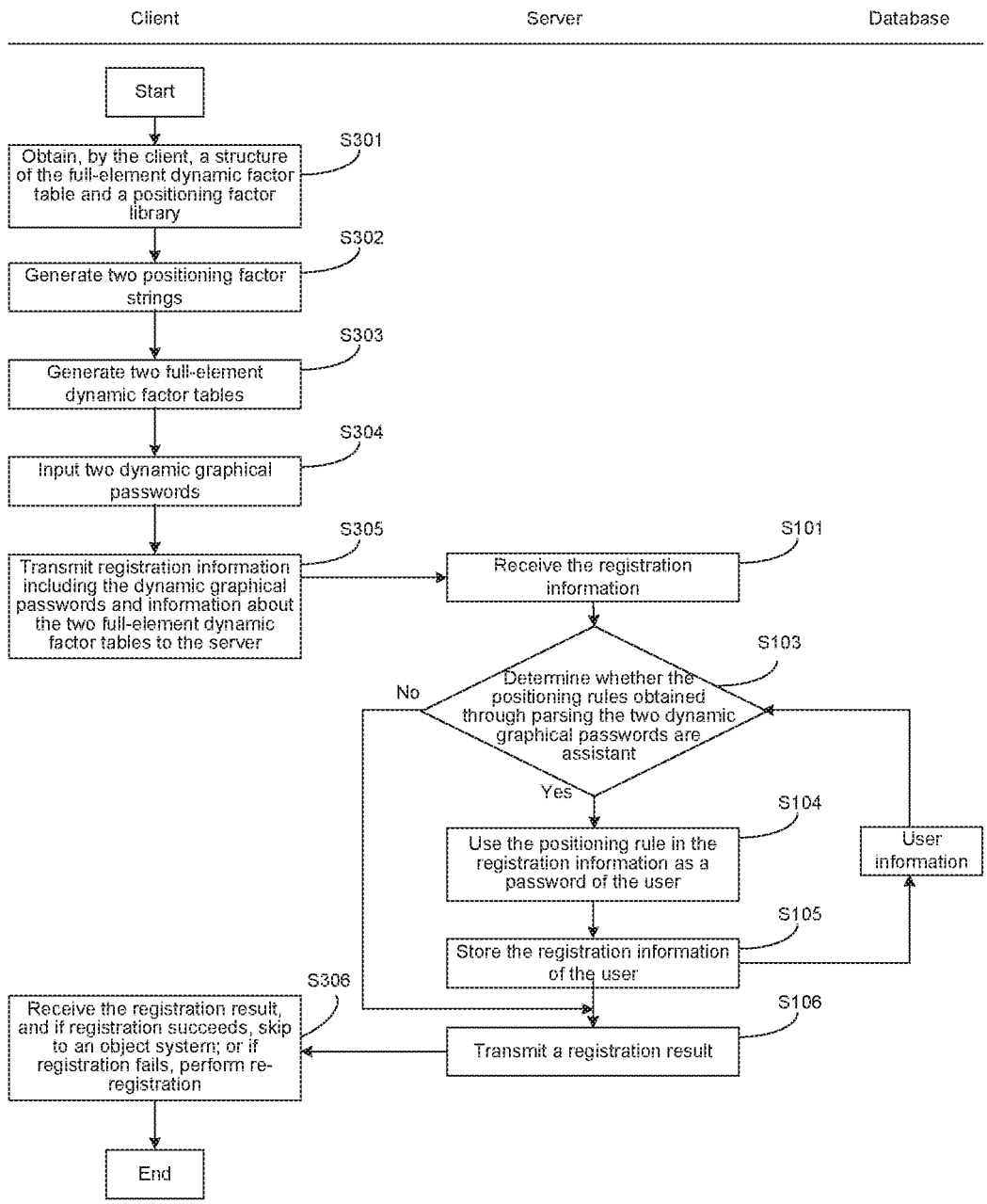
FIG. 23 is a flowchart of still another dynamic graphical password-based network registration method according to an embodiment of the present application.

FIG. 23 is a flowchart of an embodiment of the second registration method provided in the present application. The parts in this embodiment that are the same as those in the first embodiment are not described repeatedly, referring to the corresponding parts in the first embodiment. The second registration method provided in the embodiment of the present application includes the following steps:

Step S301: A client obtains a structure and a positioning factor library of a full-element dynamic factor table.

The full-element dynamic factor table is a table which is available to a user for inputting a dynamic password, and includes a structure and content.

The structure of the full-element dynamic factor table includes, but not limited to, at least one of the following structures: an outer table structure (e.g., of a regular type or an irregular type), an inner table structure (e.g., of a regular type or an irregular type), the numbers of rows and columns of an inner table, etc.

The structure of the full-element dynamic factor table may be a common structure, or a user-defined structure. The common structure includes a structure that is common to each user in a registration system. With the common structure, the full-element dynamic factor tables presented to all users have the same structure and are of the same positioning factor type. With the user-defined structure, the individualized full-element dynamic factor tables can be presented to different users.

The content of the full-element dynamic factor table is changeable, and therefore each element as the content may be referred to as a dynamic factor. In addition, because the password input by means of the full-element dynamic factor table is actually a positioning rule, the dynamic factor may also be referred to as a positioning factor.

The positioning factor library includes a plurality of selectable positioning factors. The positioning factors includes an English letter, a word, a Chinese character, a numeral, a symbol, an image, and/or a color.

During specific implementation, step S301 may have a plurality of implementation manners, and three selectable implementation manners are given below.

Manner 1. A common structure of the full-element dynamic factor table and a positioning factor library are obtained locally from the client.

If the structure of the full-element dynamic factor table and the positioning factor library are obtained in this manner, the structure information of the common structure of the full-element dynamic factor table and the positioning factor library need to be stored in the client in advance.

During specific implementation, the client may prestore the information about a plurality of structures of the common full-element dynamic factor table. When a registration function is triggered, one structure may be selected from the plurality of structures by using a preset algorithm (e.g., a random selection algorithm) as a structure actually used in current registration. Alternatively, the user who performs registration may actively select one structure, thereby improving the user experience.

Manner 2. A structure of the full-element dynamic factor table and a positioning factor library are obtained from a server.

Obtaining a structure of the full-element dynamic factor table and a positioning factor library in this manner, the method may include the following specific steps: 1) the client transmits a registration request to the server; 2) the server determines the common structure of the full-element dynamic factor table and obtains the positioning factor library based on the registration request, and transmits the structure of the full-element dynamic factor table and the positioning factor library to the client.

So far, two selectable implementation manners of step S301 have been described.

It should be noted that the above two manners have respective advantages and disadvantages. In Manner 1, because it is unnecessary to obtain the structure and the positioning factor library from the server each time, network traffic can be effectively saved, but there may be a problem that the locally prestored information is not updated in time. In Manner 2, because the structure and the positioning factor library need to be firstly obtained from the server during registration each time, more network traffic needs to be consumed, but it can be ensured that the latest structure and positioning factor library are obtained. In practical application, either of the manners may be selected, depending on a specific requirement, to enable the client to obtain the structure of the full-element dynamic factor table and the positioning factor library.

Manner 3. A user defines a structure of a full-element dynamic factor table and a positioning factor library on the client.

The structures obtained in Manner 1 and Manner 2 are both common structures. The function of presenting individualized full-element dynamic factor tables to different users can be achieved in Manner 3, so that the user can define a structure of a full-element dynamic factor table and a positioning factor library on the client.

It can be specifically implemented in the following manners: a registration function is triggered when a client page is loaded or the user taps on some buttons on the page; the user inputs a user name on the client; the client provides the function of setting a structure of the full-element dynamic factor table, and the user defines the structure information of the full-element dynamic factor table, such as a positioning factor type, a shape, whether to rotate, and so on.

After obtaining the structure of the full-element dynamic factor table and the positioning factor library, the client may proceed to a next step, to generate two positioning factor strings.

Step S302: The positioning factors are selected from the positioning factor library based on the structure of the dynamic factor table, and generate two positioning factor strings.

Because the full-element dynamic factor table consists of the structure and the content, when the full-element dynamic factor table is transmitted between different apparatuses, the structure and the content may be separately transmitted. The content of the full-element dynamic factor table includes a plurality of dynamic factors, and a character string formed by the dynamic factors is referred to as a positioning factor string.

Step S302 is performed to select positioning factors from the positioning factor library based on the structure of the dynamic factor table obtained in the previous step, and generate two positioning factor strings. The positioning factor string generated in this step may include positioning factors of multiple types, such as English letter, word, Chinese character, numeral, symbol, image, and color.

Step S303: Two full-element dynamic factor tables are generated based on the two positioning factor strings.

The two full-element dynamic factor tables can be generated based on the two positioning factor strings and the structure of the full-element dynamic factor table.

In an alternative manner, when the positioning factor string is mapped into the full-element dynamic factor table, the displayed content of some particular positioning factors may be further replaced with other content. For example, the positioning factor is a word "china", and because the positioning factor has a certain length, the visual experience of the user may be affected (e.g., the visual effect is obscured) when the positioning factor is directly displayed in the dynamic factor table, thereby degrading the user experience. In this case, the long positioning factor may be replaced with a short character. For example, the actually transmitted positioning factor is "china", while A1 is displayed in the dynamic factor table. In conclusion, a mapping relationship is formed between the transmitted positioning factor and the displayed positioning factor, which further increases the difficulty in cracking a password.

Step S304: A user inputs two dynamic graphical passwords based on the two full-element dynamic factor tables.

Step S305: The registration information including the two dynamic graphical passwords and the information of the two full-element dynamic factor tables is transmitted to a server.

Because the full-element dynamic factor tables for inputting of the dynamic graphical passwords are generated on the client, the information, which includes the two dynamic graphical passwords input by the user and the two full-element dynamic factor tables generated by the client, needs to be transmitted to the server, so as to enable the server to obtain positioning rules through parsing the dynamic graphical passwords.

During specific implementation, the information of the two full-element dynamic factor tables included in the registration information may be of a character type (i.e., the two positioning factor strings corresponding to the two full-element dynamic factor tables), or of a picture type (i.e., the graphics of the two dynamic factor table corresponding to the two full-element dynamic factor tables).

It should be noted that when defining the structure of the full-element dynamic factor table and the positioning factor library through the client in Manner 3, the registration information may further include the user-defined positioning factor library and structure of the full-element dynamic factor table, so that the server can store the two kinds of information in correspondence to the user name. In addition, the registration information may further include information such as the user name.

Step S101: The server receives the registration information transmitted by the client.

Step S103: The server determines whether the positioning rules obtained through parsing the two dynamic graphical passwords in the registration information are consistent.

If the two positioning rules obtained through parsing are consistent, user registration succeeds, and step S104 is performed to use the positioning rule in the registration information as the password registered by the user. If the two positioning rules obtained through parsing are inconsistent, user registration fails, and step S106 is performed to transmit a user registration failure result to the client.

Step S104: If the positioning rules obtained through parsing the two dynamic graphical passwords are consistent, the positioning rule in the registration information is used as the password of the user.

Step S105: The registration information of the user is stored.

Step S106: A registration result is transmitted to the client.

If the two positioning rules obtained through parsing are consistent, a user registration success result is sent.

Different from the first registration method, in the second registration method, the server parses the two dynamic graphical passwords, based on the two full-element dynamic factor tables transferred by the client, to obtain the two positioning rules.

In addition, when defining the structure of the full-element dynamic factor table and the positioning factor library through the client in Manner 3, the second registration method may further include a step of storing the user-defined structure and/or positioning factor library in correspondence to the user name.

Corresponding to the embodiment of the another dynamic graphical password-based network registration method, another dynamic graphical password-based network registration system is further provided in the embodiment of the present disclosure.

Figure 24:
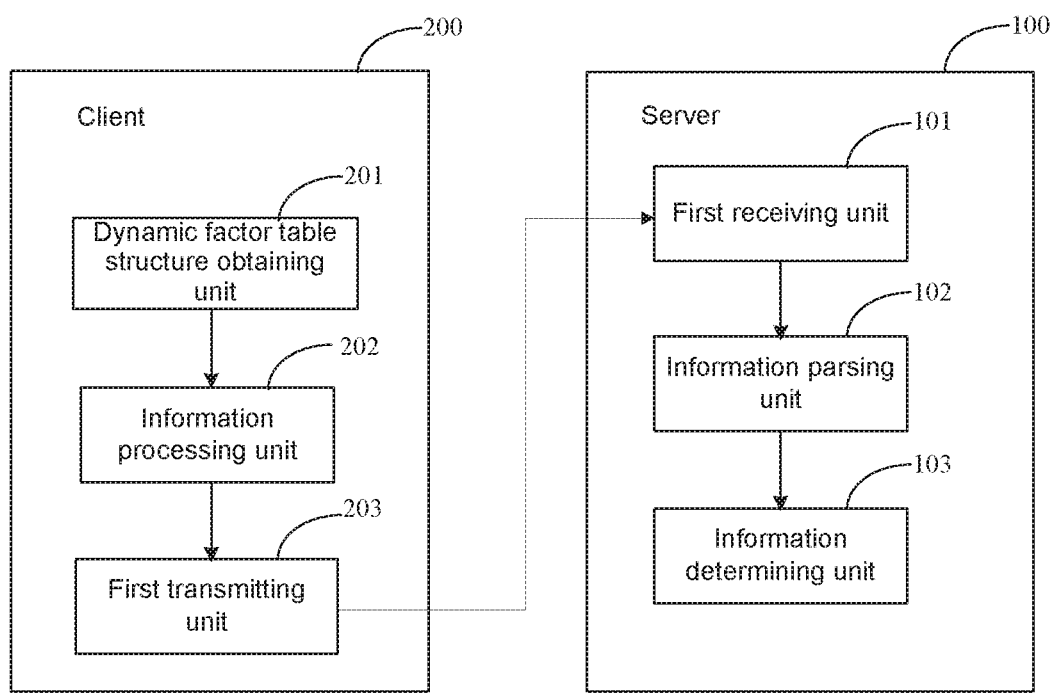
FIG. 24 is a structural block diagram illustrating still another dynamic graphical password-based network registration system according to an embodiment of the present application.

FIG. 24 is a schematic diagram illustrating an embodiment of the another dynamic graphical password-based network registration system according to the present application. The system embodiment is basically similar to the method embodiment, and therefore is described briefly. The description of related parts can refer to the corresponding parts in the method embodiment. The system embodiment described below is merely exemplary.

The another dynamic graphical password-based network registration system in this embodiment includes: a server 100 providing a registration service for a network access user, and a client 200 that is connected to the server via a network and provides network registration for the user.

The client 200 includes: a dynamic factor table structure obtaining unit 201, an information processing unit 202, and a first transmitting unit 203 configured to transmit information to the server.

The dynamic factor table structure obtaining unit 201 is configured to obtain a structure of a full-element dynamic factor table.

The information processing unit 202 is configured to select positioning factors from a positioning factor library based on the structure of the dynamic factor table, and generate two positioning factor strings. The user inputs two dynamic graphical passwords based on the two full-element dynamic factor tables generated based on the two positioning factor strings.

The first transmitting unit 203 is configured to transmit registration information, which includes the two dynamic graphical passwords and the information of the two full-element dynamic factor tables, to the server.

The server 100 includes: a first receiving unit 101 configured to receive information from the client 102, an information parsing unit, and an information determining unit 103.

The first receiving unit 101 is configured to receive the registration information.

The information parsing unit 102 is configured to parse the two dynamic graphical passwords to obtain the corresponding positioning rules.

The information determining unit 103 is configured to determine that the positioning rules obtained through parsing the two dynamic graphical passwords are consistent, and store the positioning rule in the registration information as a password of the user.

Alternatively, the dynamic factor table structure obtaining unit 201 includes a registration request transmitting sub-unit, configured to transmit, by the client, a registration request to the server.

Accordingly, the server includes:

a registration request receiving sub-unit, configured to receive, by server, the registration request transmitted by the client;

a structure determining sub-unit, configured to determine the structure of the full-element dynamic factor table; and a structure obtaining sub-unit, configured to transmit the structure of the full-element dynamic factor table to the client.

In the another dynamic graphical password-based network registration method provided in the embodiment of the present application, it is on the client that the positioning factors are selected and the positioning factor strings are generated, so that the computing resources of the client are fully utilized to effectively share the computing tasks of the server. Therefore, the consumption of computing resources of the server can be effectively reduced, thereby improving the server performance.

Corresponding to the another dynamic graphical password-based network registration method, an embodiment of the present application further provides still another dynamic graphical password-based network registration method (referred to as a third registration method for short below).

The basic core idea of the third registration method provided in the embodiment of the present application is that a client and a server separately generate the same full-element dynamic factor table by using a uniform algorithm. In this processing manner, it is unnecessary to transmit the information of the full-element dynamic factor table via a network, which can effectively increase the difficulty in cracking a password.

Figure 25:
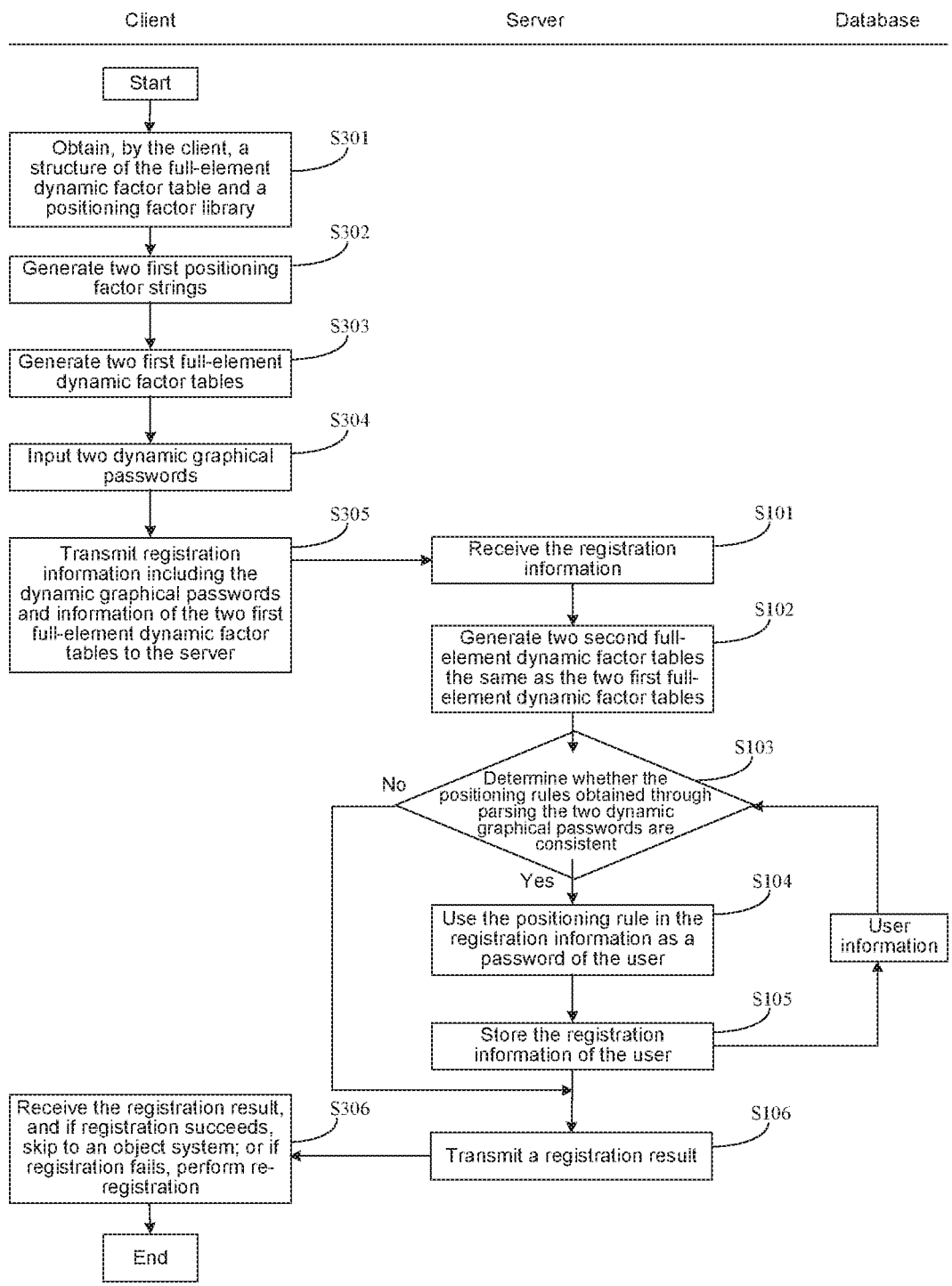
FIG. 25 is a flowchart of yet another dynamic graphical password-based network registration method according to an embodiment of the present application.

FIG. 25 is a flowchart of an embodiment of the third registration method provided in the present application. The parts in this embodiment that are the same as those in the foregoing embodiment are not described repeatedly, referring to the corresponding parts in the foregoing embodiment for details. The third registration method provided in the embodiment of the present application includes the following steps:

Step S301: A client obtains a structure of a full-element dynamic factor table and a positioning factor library.

The structure of the full-element dynamic factor table may be a common structure, or a user-defined structure.

During specific implementation, step S301 may have a plurality of implementation manners. For example, a common structure of a full-element dynamic factor table and a positioning factor library are obtained locally from the client, a common structure of a full-element dynamic factor table and a positioning factor library are obtained from a server, or a structure of a full-element dynamic factor table and a positioning factor library are defined by a user on the client.

Step S302: The positioning factors are selected from the positioning factor library based on the dynamic factor table structure, and two first positioning factor strings are generated.

During specific implementation, the client may firstly generate a shared key, and then generate two first positioning factor strings based on the shared key. In practical application, the shared key may be firstly generated by the server, and then obtained by the client from the server via a network. In this processing manner, the difficulty in illegally obtaining the generation algorithm of the shared key can be increased, so that the difficulty in cracking a password can be effectively increased.

Step S303: Two first full-element dynamic factor tables are generated based on the two first positioning factor strings.

Step S304: A user inputs two dynamic graphical passwords based on the two first full-element dynamic factor tables.

Step S305: The registration information including the two dynamic graphical passwords is transmitted to a server.

Because the client and the server separately generate the same dynamic factor table, the registration information transmitted to the server does not need to include the two first full-element dynamic factor tables generated by the client.

It should be noted that if the two first positioning factor strings are generated based on the shared key generated by the client, the shared key needs to be transferred to the server, so that the server can generate, based on the shared key, two second full-element dynamic factor tables which are the same as the two first full-element dynamic factor tables. If the shared key is generated by the server, the registration information does not need to include the shared key.

Step S101: The server receives the registration information transmitted by the client.

As an alternative implementation manner, the registration information may further include the time when the client transmits the information. After receiving the registration information, the server may firstly determine, based on the time parameter, whether the time interval between the time when the client transmits the information and the current time is greater than a preset time interval threshold. If yes, it indicates that the time it takes when the information reaches the server from the client is beyond a set time period. As the operation times out, an information indication of operation timing out is transmitted back to the client, and the current registration process terminates. The final result is that the registration fails. In this processing manner, the difficulty in cracking password can be further increased.

Step S102: Two second full-element dynamic factor tables which are the same as the two first full-element dynamic factor tables are generated.

The server needs to generate two second full-element dynamic factor tables which are the same as the two first full-element dynamic factor tables by using the same dynamic factor table generation algorithm as the client.

Step S103: The server parses the two dynamic graphical passwords based on the two second full-element dynamic factor tables, and determines whether the positioning rules obtained through parsing the two dynamic graphical passwords in the registration information are consistent.

Step S104: If the positioning rules obtained through parsing the two dynamic graphical passwords are consistent, the positioning rule in the registration information is used as the password of the user.

Step S105: The registration information of the user is stored.

Step S106: A registration result is transmitted to the client.

If the two positioning rules obtained through parsing are consistent, a user registration success result is sent.

In addition, when the user defines the structure of the full-element dynamic factor table and the positioning factor library on the client, the third registration method may further include a step of storing the user-defined structure and/or positioning factor library in correspondence to the user name.

Corresponding to the embodiment of the still another dynamic graphical password-based network registration method, an embodiment of the present disclosure further provides still another dynamic graphical password-based network registration system.

Figure 26:
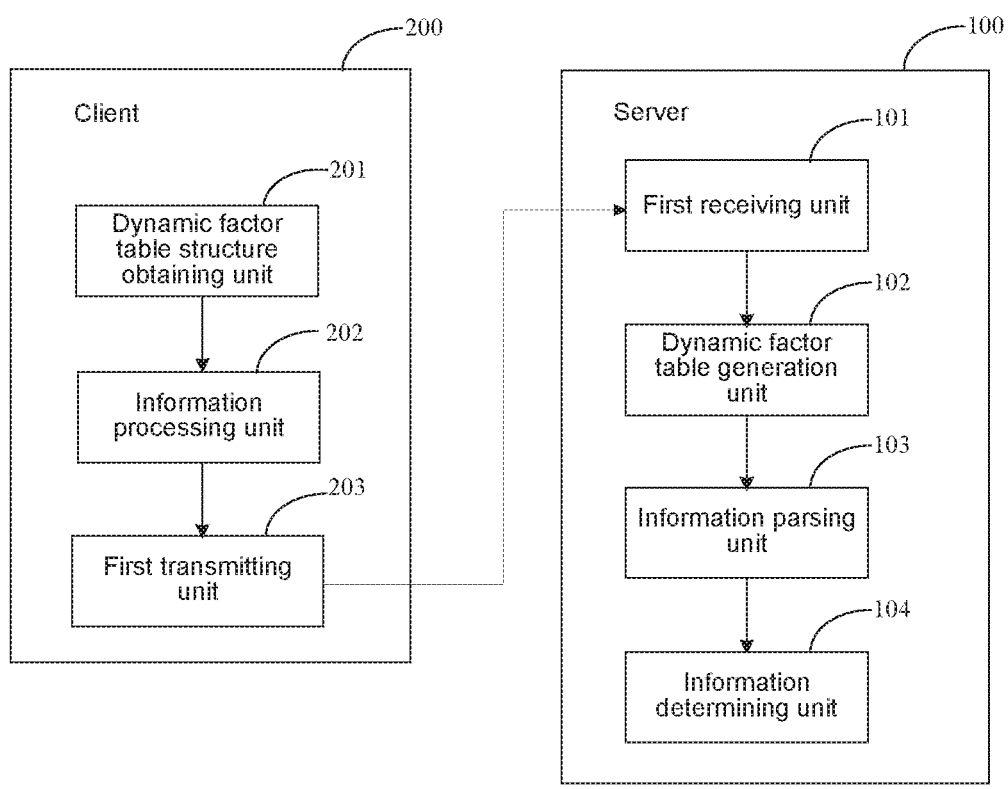
FIG. 26 is a structural block diagram illustrating yet another dynamic graphical password-based network registration system according to an embodiment of the present application.

FIG. 26 is a schematic diagram illustrating an embodiment of the still another dynamic graphical password-based network registration system provided in the present application. The system embodiment is basically similar to the method embodiment and therefore described briefly, and the description of related parts can refer to the corresponding parts in the method embodiment. The system embodiment described below is merely exemplary.

The still another dynamic graphical password-based network registration system in this embodiment includes: a server 100 providing a registration service for a network access user, and a client 200 that is connected to the server via a network and provides network registration for the user.

The client 200 includes: a dynamic factor table structure obtaining unit 201, an information processing unit 202, and a first transmitting unit 203 configured to transmit information to the server.

The dynamic factor table structure obtaining unit 201 is configured to obtain a structure of a full-element dynamic factor table.

The information processing unit 202 is configured to select, based on the dynamic factor table structure, positioning factors from a positioning factor library, and generate two first positioning factor strings. The user inputs two dynamic graphical passwords based on two first full-element dynamic factor tables generated based on the two first positioning factor strings.

The first transmitting unit 203 is configured to transmit registration information including the two dynamic graphical passwords to the server.

The server 100 includes: a first receiving unit 101 configured to receive information from the client, a dynamic factor table generation unit 102, an information parsing unit 103, and an information determining unit 104.

The first receiving unit 101 is configured to receive the registration information.

The dynamic factor table generation unit 102 is configured to generate two second full-element dynamic factor tables that are the same as the two first full-element dynamic factor tables.

The information parsing unit 103 is configured to parse, the two dynamic graphical passwords based on the two second full-element dynamic factor tables to obtain the positioning rules corresponding to the two dynamic graphical passwords.

The information determining unit 104 is configured to determine that positioning rules obtained through parsing the two dynamic graphical passwords are consistent, and store the positioning rule in the registration information as the password of the user.

It should be noted that the relation terms herein such as "first" and "second" are used only to differentiate an entity or operation from another entity or operation, and it is not required or implied that there exist an actual relationship or order between these entities or operations. Moreover, the terms "include", "comprise", or any other variant thereof are intended to cover a non-exclusive inclusion, so that a process, a method, an article, or a device that includes a series of elements not only includes those elements but also includes other elements which are not expressly listed, or further includes the elements inherent to such process, method, article, or device. If no more limitations are made, an element limited by "include a/an . . . " does not exclude other same elements existing in the process, the method, the article, or the device including the element.

The foregoing descriptions are merely specific implementation manners of the present application, whereby those skilled in the art can understand or implement the present application. Various modifications to these embodiments will be obvious to those skilled in the art, and the general principle defined herein may be applied to other embodiments without departing from the spirit or scope of the present application. Therefore, the present application will not be limited to the embodiments described herein, but extends to the widest scope that complies with the principle and novelty disclosed in this specification.

The invention claimed is:

1. A dynamic graphical password-based network registration method, comprising:
obtaining, by a client, a structure of a full-element dynamic factor table;
selecting, by the client, positioning factors from a positioning factor library based on the structure of the full-element dynamic factor table, and generating, by the client, two first positioning factor strings;
inputting, to the client by a user, two dynamic graphical passwords based on two first full-element dynamic factor tables generated, by the client, based on the two first positioning factor strings, and transmitting, by the client, registration information comprising the two dynamic graphical passwords to a server;
receiving, by the server, the registration information transmitted by the client;
generating, by the server, two second full-element dynamic factor tables that are the same as the two first full-element dynamic factor tables; and
parsing, by the server, the two dynamic graphical passwords based on the two second full-element dynamic factor tables, and if positioning rules obtained through parsing the two dynamic graphical passwords are consistent, using, by the server, the one or more obtained positioning rules in the registration information as a password of the user, and storing the password to complete a user registration.

2. The method according to claim 1, wherein each of the full-element dynamic factor tables comprises an outer table and an inner table, the outer table comprises at least one inner table, each inner table comprises a plurality of positioning factors, and a same positioning factor appears at least twice in the full-element dynamic factor table.

3. The method according to claim 2, wherein the method further comprises: negotiating, by the client and the server, an identification rule of each inner table, or a distribution change rule of each inner table in the outer table.

4. The method according to claim 3, wherein the distribution change rule comprises: a clockwise change rule, a counterclockwise change rule, or a random change rule.

5. The method according to claim 4, wherein each of the dynamic graphical passwords comprises a positioning graphic formed by at least one positioning factor according to the one or more obtained positioning rules, and the one or more obtained positioning rule comprises one of combining of consecutive positioning factors, combining of non-consecutive positioning factors, combining of repeated positioning factors at a same location, and combining of fixed characters, or any combination thereof.

6. The method according to claim 5, wherein the at least one positioning factor comprises an English letter, a word, a Chinese character, a numeral, a symbol, an image, or a color.

7. A dynamic graphical password-based network registration system, comprising: a server providing registration service for a network access user, a client that is connected to the server via a network which provides network registration for the user, and a positioning factor library, wherein
the client comprises: a dynamic factor table structure obtaining logic, an information processing logic, and a first transmitter configured to transmit information to the server;
wherein the dynamic factor table structure obtaining logic is configured to obtain a structure of a full-element dynamic factor table; and
the information processing logic is configured to select positioning factors from the positioning factor library based on the structure of the full-element dynamic factor table, generate two first positioning factor strings, and via the first transmitter transmit registration information comprising two dynamic graphical passwords to the server, wherein the two dynamic graphical passwords are inputted to the information processing logic by the user based on two first full-element dynamic factor tables generated based on the two first positioning factor strings; and
the server comprises: a first receiver configured to receive the registration information transmitted from the client, a dynamic factor table generation logic, an information parsing logic, and an information determining logic;
wherein the dynamic factor table generation logic is configured to generate two second full-element dynamic factor tables that are the same as the two first full-element dynamic factor tables;
the information parsing logic is configured to parse, based on the two second full-element dynamic factor tables, the two dynamic graphical passwords to obtain positioning rules corresponding to the two dynamic graphical passwords; and the information determining logic is configured to determine that the positioning rules obtained through parsing the two dynamic graphical passwords are consistent, and store one or more of the obtained positioning rules in registration information as the password of the user.

* * * * *